(12) United States Patent
Purwin et al.

(10) Patent No.: US 10,000,284 B1
(45) Date of Patent: Jun. 19, 2018

(54) COLLABORATIVE UNMANNED AERIAL VEHICLE FOR AN INVENTORY SYSTEM

(71) Applicant: Amazon Technologies, Inc., Seattle, WA (US)

(72) Inventors: Oliver Christoph Purwin, Andover, MA (US); Andrew Stubbs, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 14/752,746

(22) Filed: Jun. 26, 2015

(51) Int. Cl.
*B64C 39/02* (2006.01)
*B64D 1/02* (2006.01)
*B64B 1/26* (2006.01)

(52) U.S. Cl.
CPC .................. *B64D 1/02* (2013.01); *B64B 1/26* (2013.01); *B64C 39/024* (2013.01); *B64C 2201/128* (2013.01)

(58) Field of Classification Search
CPC ........ B64D 1/22; B64D 2201/00; B64B 1/26; B64B 1/70; B64C 2201/128
See application file for complete search history.

(56) References Cited

U.S. PATENT DOCUMENTS

| | | | | |
|---|---|---|---|---|
| 1,778,273 A | * | 10/1930 | Park .......................... | B64B 1/00 244/29 |
| 3,017,138 A | | 1/1962 | Flint et al. | |
| 3,353,501 A | | 11/1967 | Kidera et al. | |
| 4,685,640 A | * | 8/1987 | Warrington ............... | B64B 1/00 244/23 C |
| 5,431,359 A | | 7/1995 | Belie et al. | |
| 5,755,402 A | * | 5/1998 | Henry ........................ | B64B 1/36 244/128 |
| 6,328,622 B1 | | 12/2001 | Geery et al. | |
| 7,920,952 B2 | | 4/2011 | Miura et al. | |
| 8,052,082 B1 | * | 11/2011 | Herlik ........................ | B64B 1/08 244/125 |
| 8,280,547 B2 | | 10/2012 | D'Andrea et al. | |
| 9,305,280 B1 | | 4/2016 | Isaacs et al. | |
| 9,346,547 B2 | | 5/2016 | Patrick et al. | |
| 9,656,805 B1 | | 5/2017 | Evans et al. | |
| 2006/0065777 A1 | | 3/2006 | Walden et al. | |
| 2006/0284002 A1 | * | 12/2006 | Stephens ................. | B64C 15/00 244/12.4 |

(Continued)

OTHER PUBLICATIONS

U.S. Appl. No. 14/752,725, filed Jun. 26, 2015, Titled: Collaborative Unmanned Aerial Vehicle Inventory System.

(Continued)

Primary Examiner — Jessica B Wong
(74) Attorney, Agent, or Firm — Kilpatrick Townsend & Stockton LLP

(57) ABSTRACT

The disclosed unmanned aerial vehicle (UAV) includes a buoyant airbag, a drive unit, a retention feature, and an onboard control module that can be configured to cause the drive unit to displace the UAV, cause the retention feature to retain one or more items for transport, and receive instructions to transfer items from one location to another. For example, a UAV can be controlled to obtain an item at one location in a warehouse such as a first floor, lift said item to a second location in the warehouse such as a second floor, and deposit the item at the second location.

20 Claims, 19 Drawing Sheets

(56) References Cited

U.S. PATENT DOCUMENTS

| | | | |
|---|---|---|---|
| 2009/0050750 A1* | 2/2009 | Goossen | B64C 39/024 244/76 R |
| 2011/0233325 A1 | 9/2011 | Kramer et al. | |
| 2012/0143427 A1 | 6/2012 | Hoffman et al. | |
| 2013/0062457 A1* | 3/2013 | Deakin | B64B 1/08 244/25 |
| 2013/0068879 A1* | 3/2013 | Colting | B64B 1/20 244/25 |
| 2014/0339356 A1 | 11/2014 | Deakin | |
| 2015/0076279 A1 | 3/2015 | Nelson | |
| 2016/0009393 A1 | 1/2016 | Repp et al. | |
| 2016/0378113 A1 | 12/2016 | Bernhardt et al. | |
| 2017/0029097 A1* | 2/2017 | Matsumoto | B64C 27/006 |
| 2017/0032315 A1 | 2/2017 | Gupta et al. | |

OTHER PUBLICATIONS

U.S. Appl. No. 14/635,964, filed Mar. 2, 2015, Titled: Managing Low-Frequency Inventory Items in a Fulfillment Center.

\* cited by examiner

US 10,000,284 B1

COLLABORATIVE UNMANNED AERIAL VEHICLE FOR AN INVENTORY SYSTEM

CROSS-REFERENCE TO RELATED APPLICATIONS

This application is related to and incorporates by reference for all purposes the full disclosure of co-pending U.S. patent application Ser. No. 14/752,725, filed Jun. 26, 2015, entitled "COLLABORATIVE UNMANNED AERIAL VEHICLE INVENTORY SYSTEM", the contents of which are herein incorporated in its entirety.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. Expanding the size or capabilities of many inventory systems requires significant changes to existing infrastructure and equipment. As a result, efforts are made to increase the utilization of space bounded by a finite infrastructure by increasing the density of packing in both horizontal and vertical directions. For example, inventory systems are now occasionally split between ground floors and mezzanine levels within a large structure. However, moving inventory items into or out of densely packed storage areas or multi-level storage areas can be inefficient using existing ground-based units or conventional vertical displacement mechanisms like elevators.

BRIEF DESCRIPTION OF THE DRAWINGS

Various embodiments in accordance with the present disclosure will be described with reference to the drawings, in which:

FIG. 7 illustrates a UAV for implementing aspects of an inventory system such as the example system shown in FIG. 1, in perspective view, in accordance with embodiments;

FIG. 8 illustrates the UAV shown in FIG. 7 in greater detail, in a top plan view;

FIG. 9 illustrates the UAV shown in FIGS. 7 and 8 in greater detail, in a side section view;

DETAILED DESCRIPTION

Figure 1:
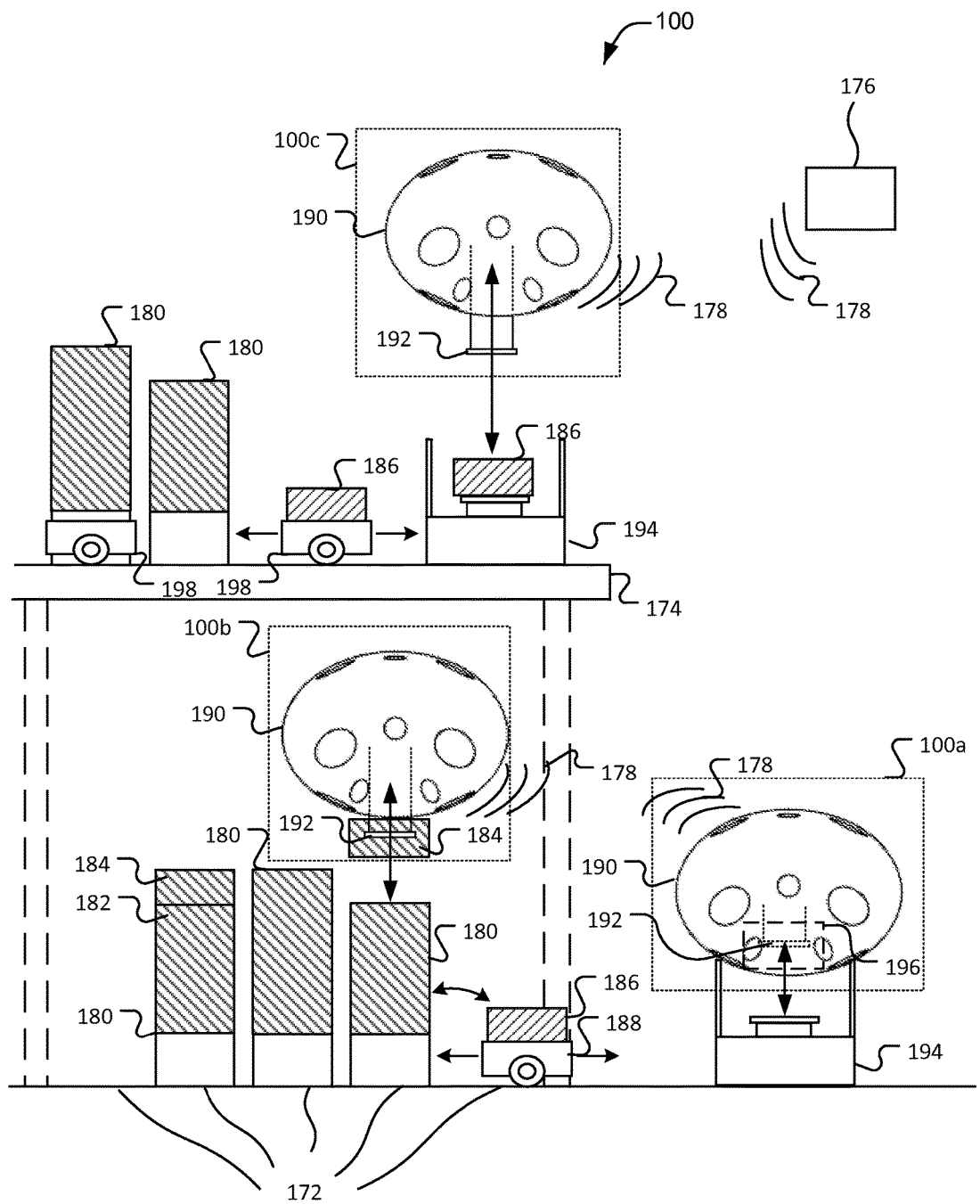
FIG. 1 illustrates an example inventory system in a side view, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to moving inventory items between inventory holders at disparate locations in an inventory management facility according to instructions from an inventory system. Disparate locations in an inventory system may be, for example, different mezzanine levels of a multi-level inventory management facility. To this end, the inventory system may include unmanned aerial vehicles (UAVs) for assisting in moving inventory items between one inventory holder and another, between an inventory holder and a staging point for shipping, or between one location in an inventory management facility and another. The inventory system can also possess autonomous ground drive units and other robotics for transporting and processing inventory items. An example of a UAV system is described in U.S. application Ser. No. 14/635,964, filed Mar. 2, 2015, which is incorporated herein by reference in its entirety.

Embodiments herein are also directed to UAVs for carrying items, which can include partially or fully autonomous devices that can hover, translate horizontally and vertically, and carry one or more items or containers containing items. UAVs can also include a shell or balloon for storing a volume at lower mass density than air, i.e. by containing a volume of lighter-than-air gas such as helium or hydrogen. UAVs can also include one or more drive units, which may be arranged in a quad-copter configuration or any other suitable configuration, and may include additional drive units configured to impart horizontal or rotational motion without causing the UAV to tilt. UAVs can also include communication means for determining locations of one another or for interfacing with a centralized inventory system to receive instructions for retrieving and moving items, retention means for holding one or more items or containers of items, and may possess features for interfacing with a docking station for performing tasks such as recharging, adjusting a ballast, or receiving items or containers to retain for transport.

For example, suppose that an inventory management facility has two levels: a first floor and a mezzanine. Alice is an agent of the inventory management facility on the first floor, and she receives an order for items that are located on both the first floor and on the mezzanine. To accomplish the formerly laborious task of obtaining all of these items, Alice can place a request for the items with an inventory system. The inventory system can quickly identify the locations of all of the items, and can dispatch autonomous ground drive units on both the first floor and on the mezzanine to collect the items. At the mezzanine, the items can be collected at a staging point and consolidated into a container for transport. The staging point may double as a docking station for a UAV, and in some cases, the UAV and docking station may interface to recharge a power supply on the UAV, to adjust ballast, and/or to obtain information concerning the container such as weight and dimensions. The UAV can subsequently lift the container and transport the items to a staging point at the first floor, where all of the items for the order can be consolidated and provided to Alice for shipping.

In accordance with an embodiment, the inventory system may provide for the transport of items or containers containing items. More specifically, the inventory system may transport items or containers throughout portions of an inventory management facility, such as a warehouse or shipping depot. In some cases, items may be transported by autonomous ground drive units to a staging point for loading into a container for transport by a UAV. In some other cases, items may be stored in movable inventory holders, which may also be transported by autonomous ground drive units to a staging point for loading. In some other cases, items may be stored in mobile or stationary inventory holders within removable containers, or may be stored where an overhead drive unit or a UAV has access to said items, such that the items or containers can be directly obtained by a UAV without or prior to collection at a staging point.

In accordance with embodiments, a UAV for use in an inventory system as described above may include any or all of the following elements: an airbag, balloon, or shell having buoyancy in air; one or more thrust units for providing locomotion and/or supplemental lift to the UAV; one or more retention elements for holding items or containers containing items; and an onboard control element, which may perform any suitable combination of autonomously operating the UAV to perform inventory management functions, receiving high-level instructions from an inventory manager, and/or receiving direct instructions from the inventory manager. The onboard control element may also provide connectivity to a controller for any other suitable control of the UAV such as directed flight.

A UAV may also be configured to connect with a docking station, which may in some cases share functions of a staging point, in accordance with embodiments. In some cases, a docking station can provide for the removal or addition of gas or ballast to the UAV, in order to adjust the buoyancy of said UAV. In some cases, a docking station can provide temporary station keeping functionality to a UAV, e.g., holding a buoyant UAV down while a weight of items is removed from said UAV and another weight of items is added. A docking station can also provide recharging for the UAV by, for example, connecting a power supply recharging port on the UAV to an external power supply, by providing a substitute battery to the UAV, or any other suitable means of recharging. A docking station can also support a container or an item for receipt by the UAV. In all of the above cases, the docking station can interface with the UAV autonomously, or may also be capable of interfacing according to instructions provided by a user.

FIG. 1 illustrates an example inventory system 100 in a side view, in accordance with embodiments. The inventory system 100 includes operations at multiple levels of an inventory management facility including a ground floor 172 and a mezzanine 174. The system 100 includes multiple inventory holders 180 located on both the ground floor 172 and on the mezzanine 174. Some of the inventory holders 180 include permanent inventory holding structure 182 that is not removable from the inventory holder, but inventory holders may also include removable portions 184 which can, for example, be stacked on top of an inventory holder. The inventory system 100 also includes containers 186 for holding items for transport. Said containers 186 can be transported by ground drive units 188, can be emplaced at docking stations 194, and can be carried by UAVs 190.

UAVs 190 in the inventory system 100 can retain removable portions 184 of inventory holders 180 or containers 186 for holding items for transport via retention features 192. In some cases, UAVs can directly lift said removable portions 184 or containers 186 without landing at a docking station 194; but in other cases, UAVs can use said docking stations 194 for recharging, adjusting ballast, securing the removable portions 184 or containers 186, and obtaining information concerning the removable portions or containers, or other suitable use. In some embodiments, UAVs 190 can communicate with one another directly by use of wireless communication 178, and may also communicate with an inventory system management element 176. In other embodiments, UAVs 190 communicate with only the inventory system management element 176 via wireless communication 178.

UAVs 190 in the inventory system 100 can perform various inventory management functions in accordance with embodiments. In a first exemplary function 100a, a UAV 190 is shown in contact with a docking station 194 and retaining a container 186 inside an interior cavity of the UAV via a retention element 192. Docking stations 194 can include features for transferring or adjusting ballast, recharging a rechargeable battery or installing a replaceable power supply, or for weighing an item, container, or other payload.

In a second exemplary function 100b, a UAV 190 is shown retaining a removable portion 184 of an inventory holder 180 while hovering above an inventory holder. In this second exemplary function 100b, the retention feature 192 is extended below the body of the UAV 190. In a third exemplary function 100c, a UAV 190 is shown descending to retain a container 186 in a docking station 194. In this third exemplary function 100c, the inventory holder is shown extended below the body of the UAV 190.

In alternate embodiments, an inventory system may operate on a single floor, or on any practicable number of floors including multiple mezzanine floors. For example, in some embodiments, an inventory system may operate on a ground floor and on two, three, four, or more than four mezzanine floors. In some other embodiments, a ground floor may be used for non-storage purposes, such that an inventory system operates on one, two, three, four, or more mezzanine floors and may optionally ferry items or containers to the ground floor.

Figure 2:
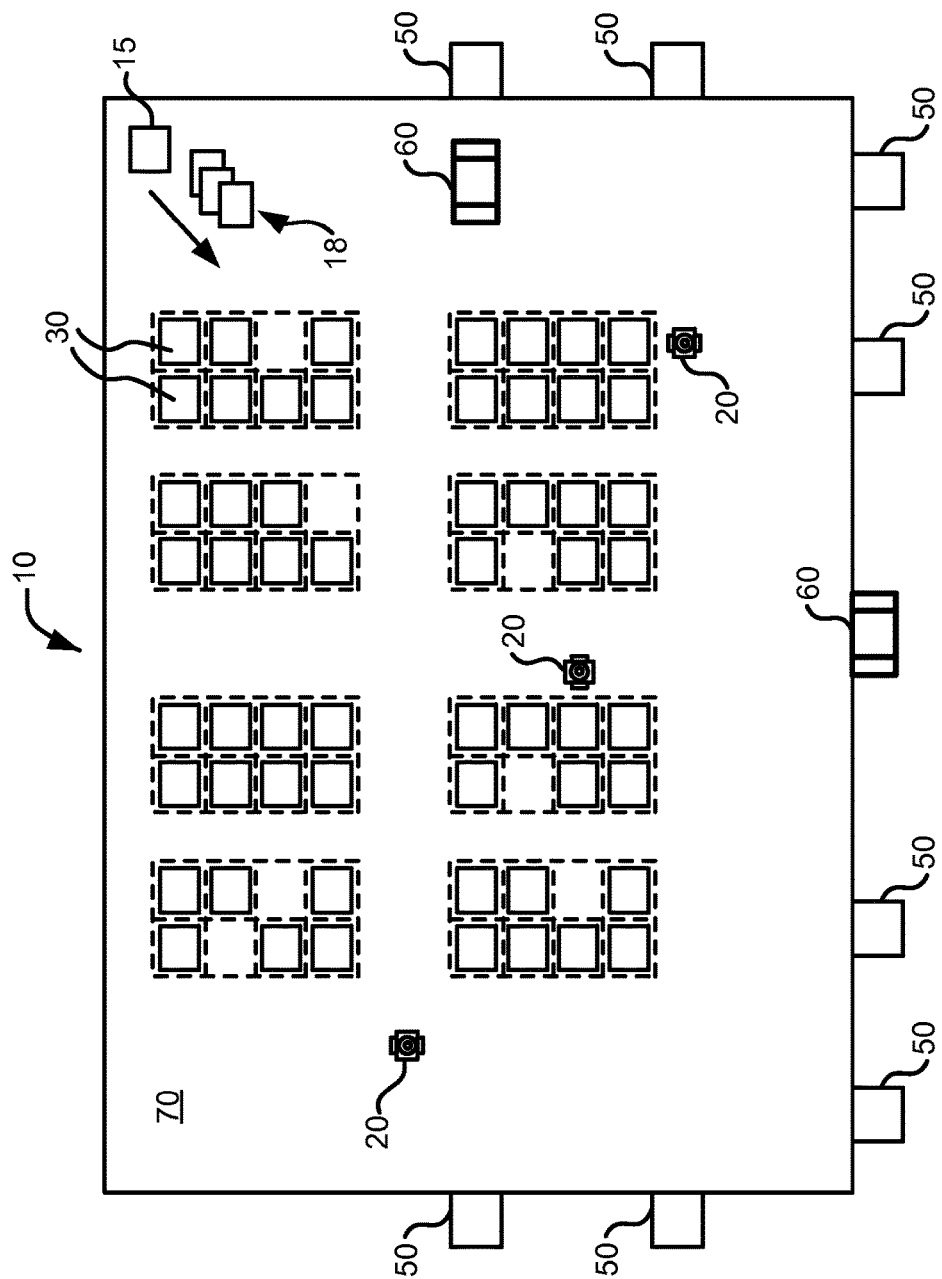
FIG. 2 illustrates components of an inventory system according to a particular embodiment.

FIG. 2 illustrates the contents of an inventory system 10. Inventory system 10 includes a management module 15, one or more mobile drive units 20, one or more inventory holders 30, one or more inventory stations 50, and one or more docking stations 60. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items. Mobile drive units 20 can also transport inventory holders 30 to docking stations 60, which can include systems for loading and unloading items from inventory holders 30.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
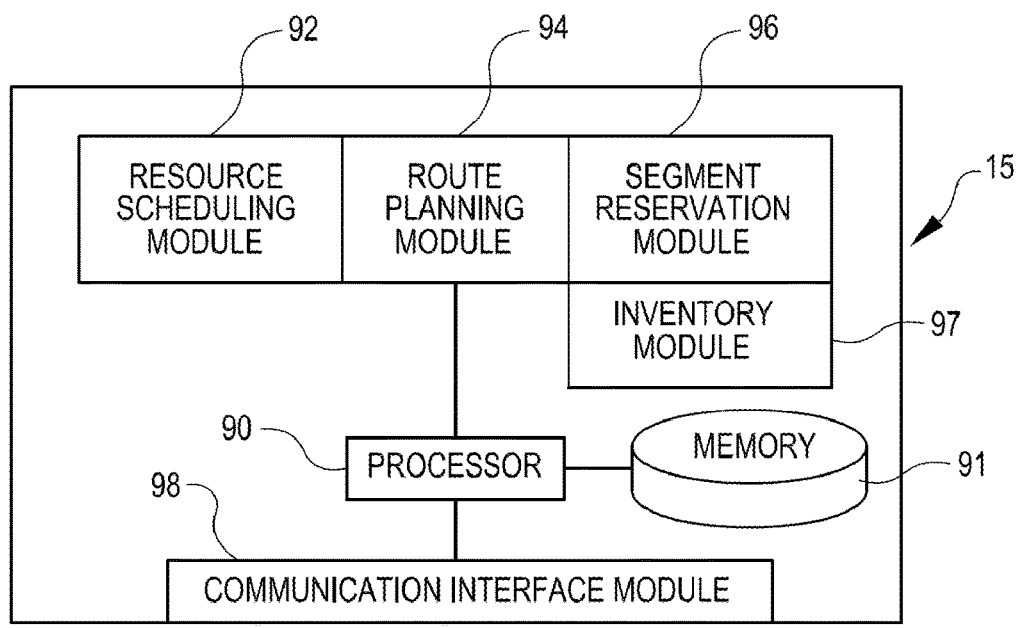
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource-scheduling module 92, a route-planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general-purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general-purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices, or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route-planning module 94 generates a path to one or more destinations identified in the route request. Route planning module 94 may implement any appropriate algorithms utilizing any appropriate parameters, factors, and/or considerations to determine the appropriate path. After generating an appropriate path, route-planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish, or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource-scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
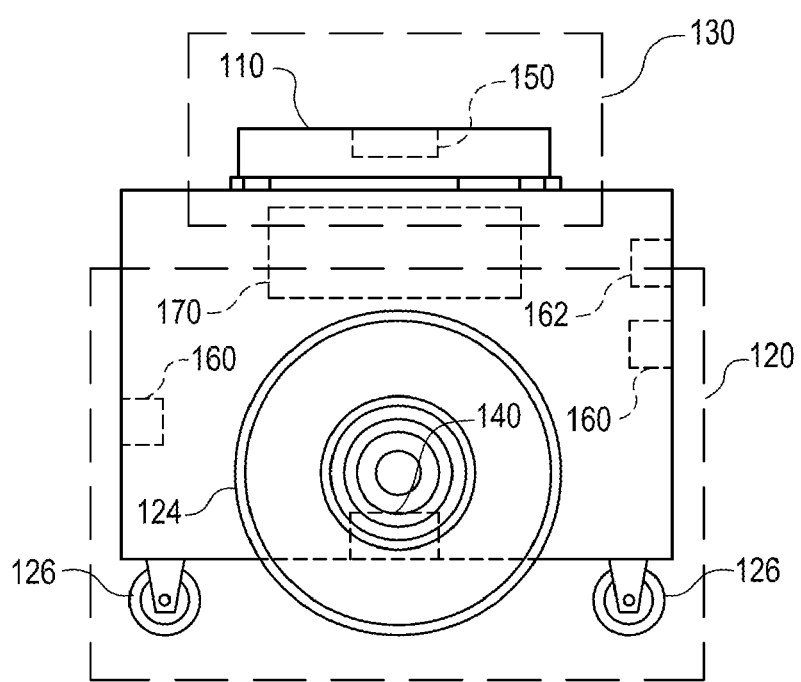
FIGS. 4 and 5 illustrate in greater detail an example mobile drive unit that may be utilized in particular embodiments of the inventory system shown in FIG. 2.

FIGS. 3 and 4 illustrate in greater detail the components of a particular embodiment of mobile drive unit 20. In particular, FIGS. 3 and 4 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3 and 4 illustrate a particular embodiment of mobile drive unit 20 containing certain components and configured to operate in a particular manner, mobile drive unit 20 may represent any appropriate component and/or collections of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30.

Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering, and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 5:
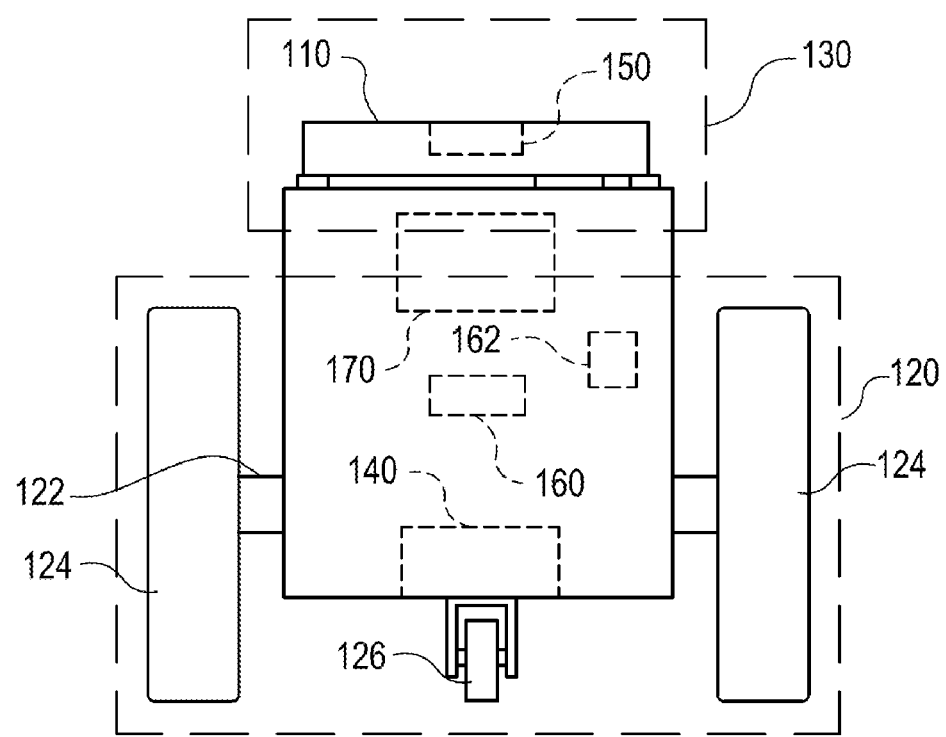
Figure 6:
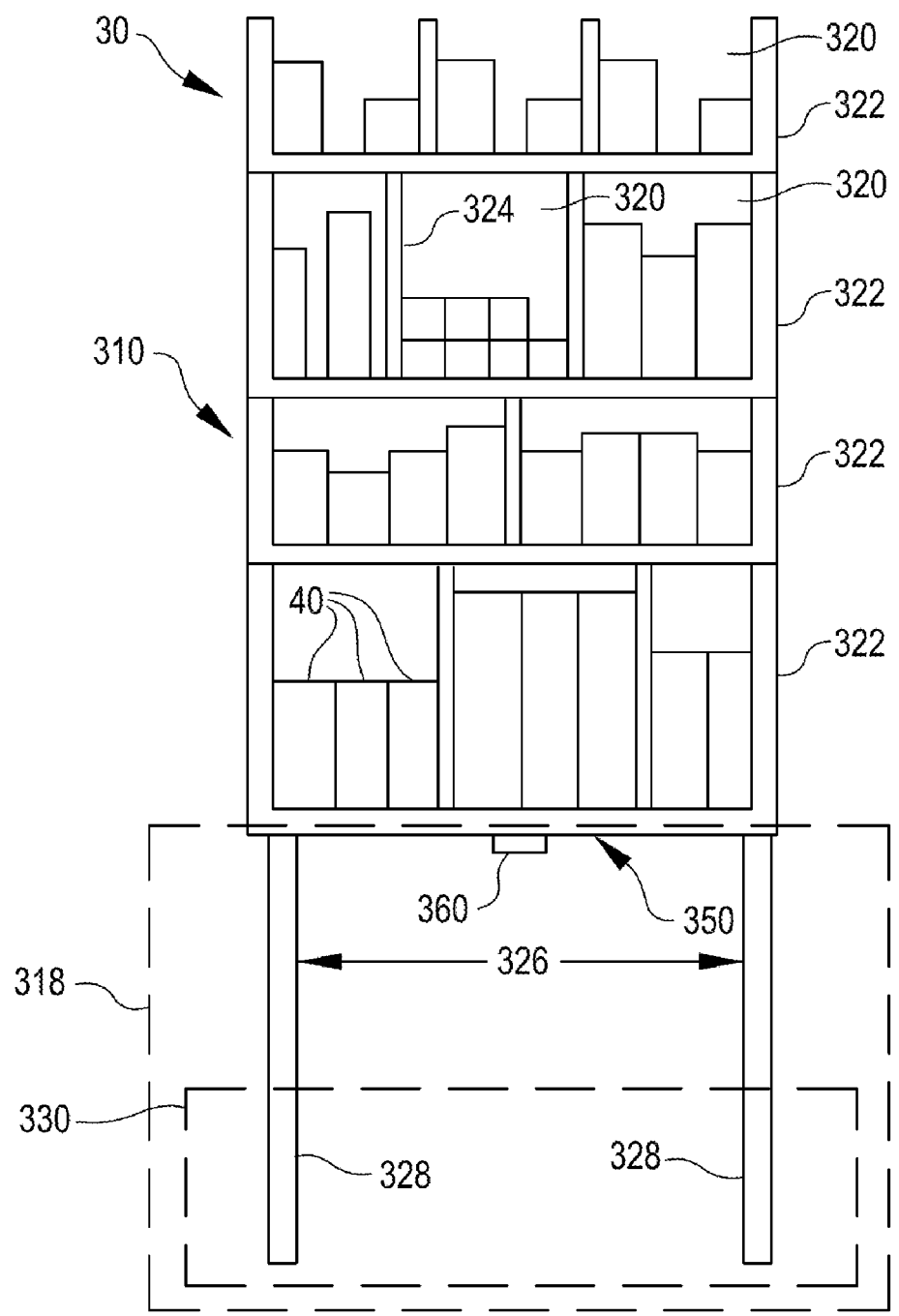
FIG. 6 illustrates in greater detail an example inventory holder that may be utilized in particular embodiments of the inventory system shown in FIG. 2.

FIG. 5 illustrates in greater detail the components of a particular embodiment of inventory holder 30. In particular, FIG. 5 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to movement of inventory items 40 between inventory holders 30; and movement of inventory items 40 between inventory holders 30 and stations 50, which may or may not be located on the same level in a multilevel inventory management facility. In accordance with some embodiments, the mobile drive units 20 are utilized to perform the function of initiating and causing the movement of inventory items 40 between the adjacent inventory holders 30 and stations 50. In some embodiments, all or a subset of inventory stations 50 may also be functional to convey inventory items into or out of UAVs, such as the UAVs 190 (FIG. 1).

Figure 7:
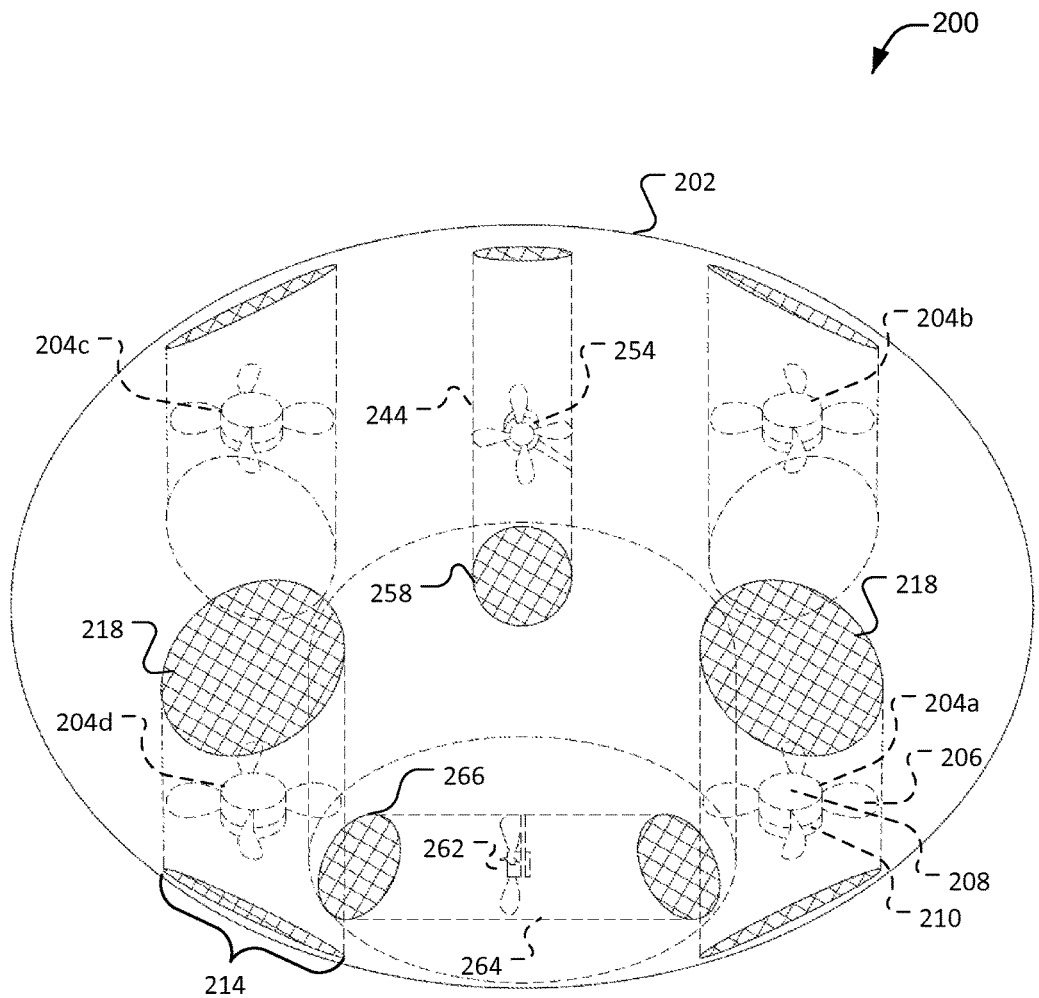
FIGS. 7-9 show an unmanned aerial vehicle (UAV) for implementing aspects of an inventory system, in accordance with embodiments.
Figure 8:
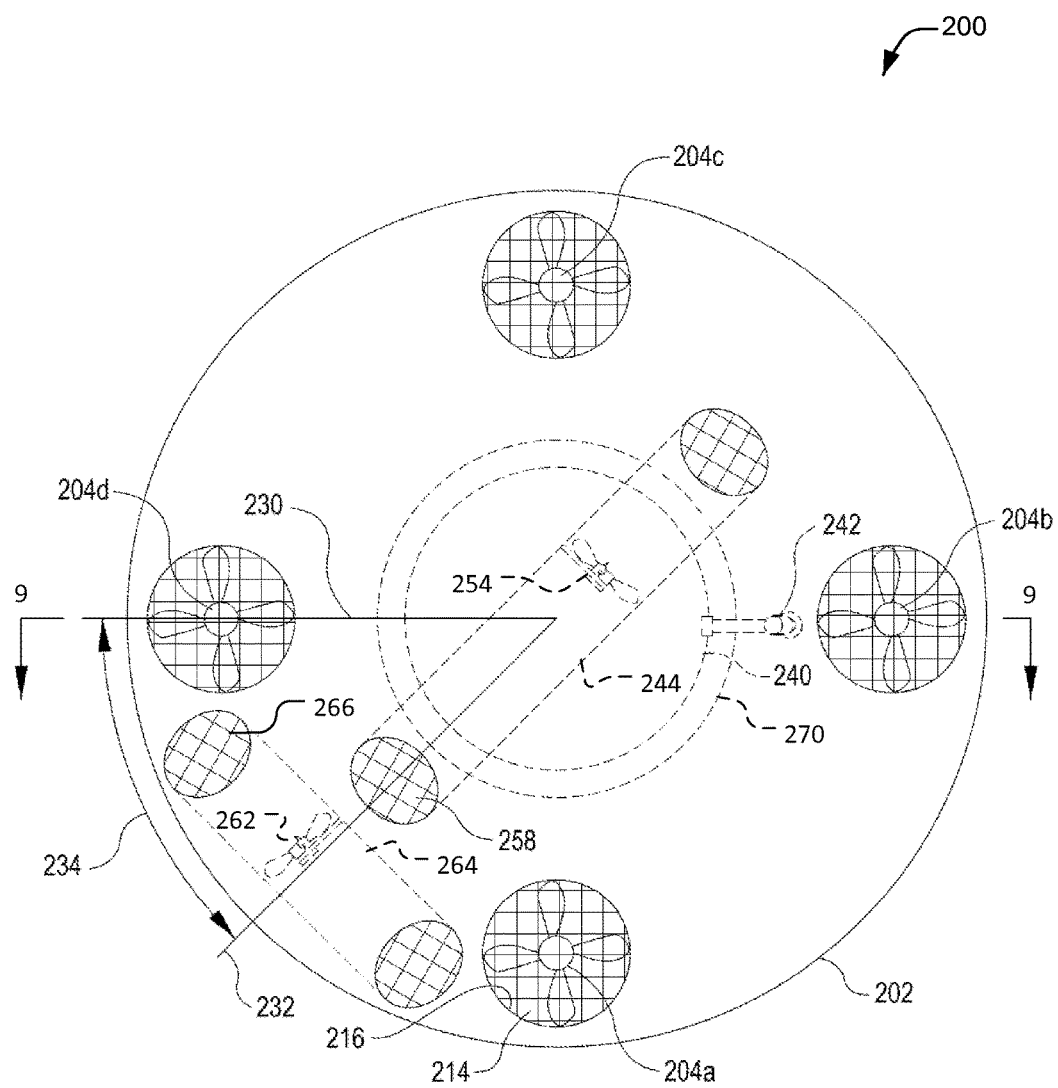
Figure 9:
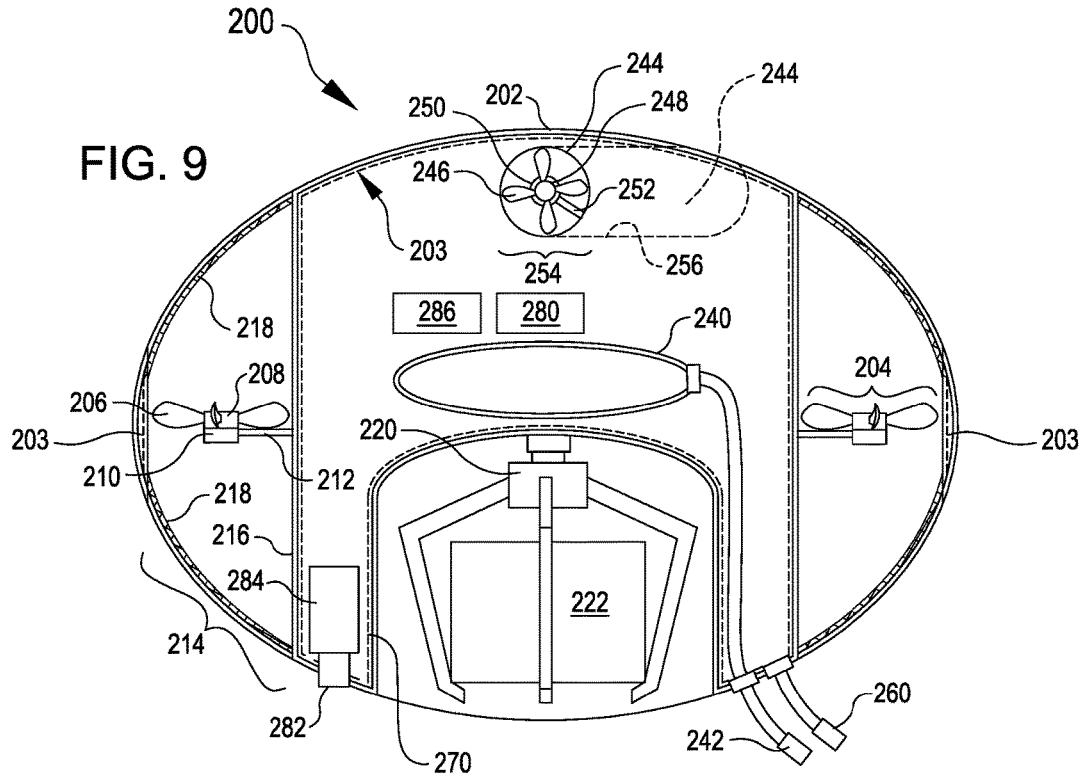

FIGS. 7-9 are directed to an example UAV 200 that can perform some or all of the functions of UAVs as shown in FIG. 1. FIG. 7 illustrates the example UAV 200 in a perspective view, showing with particularity an example of an arrangement of thrust units and structures in accordance with embodiments. The example UAV 200 is substantially enclosed by an outer shell 202 that defines outer boundaries of a lifting gas envelope 203 for containing a lifting gas. The outer shell 202 contains multiple thrust units 204 in ducts 214 passing through the lifting gas envelope 203. The shell 202 is arranged as an oblong spheroid with voids for interior features, but other shapes may be used for the shell such as, for example, a sphere, a cylindrical solid, or other suitable three-dimensional shape. Four vertical thrust units 204a, 204b, 204c, 204c (collectively, vertical thrust units 204) are arranged within the outer shell 202 and in a square configuration comparable to a quad rotor helicopter or quadcopter. Thrust units can include any suitable thrust unit for imparting momentum to a UAV, such as fans, streams of directed compressed air or gas, combustion products, jets of any suitable gas, mechanical thrust units configured to interact with a guidelines or wires, or any other suitable thrust unit. Each of the vertical thrust units 204, such as thrust unit 204a, includes multiple blades 206, a hub 208, and a motor 210; and each of the vertical thrust units 204 is enclosed in one of multiple vertical ducts 214, each duct having protective grilles 218 at superior (i.e. the top "half") and inferior (i.e., the bottom "half") surfaces of the shell 202. The shell 202 can contain a lighter-than-air gas, such as hydrogen or helium, heated air with or without a heating element for maintaining a temperature of the heated air; or any other suitable lifting gas.

In various embodiments, the volume of the shell 202 and the particular lifting gas may be selected so as to provide a buoyant force that approaches, meets, or exceeds a weight of the components of the UAV and/or a weight of the components plus a projected range of weights representing a payload or cargo of the UAV. For example, a projected range of weights representing a payload may vary according to payloads with masses from zero to 1 kg, 2 kg, 5 kg, 10 kg, 20 kg, or more. The shell 202, with a lifting gas such as helium, may provide sufficient buoyancy to offset and support the above ranges of weights of a payload at diameters ranging from 0.5 m to 1 m, 2 m, 3 m, 4 m, 5 m, or more; and height ranging from 0.2 m to 0.4 m, 0.6 m, 0.8 m. 1 m, 2 m, or more.

Although a quadcopter arrangement of vertical thrust units 204 may be used to fully control a displacement of a UAV, such as the illustrated UAV 200, including tilt, height, and direction of travel; additional thrust units are also included. For example, a horizontal thrust unit 254 is enclosed in a central horizontal duct 244 that passes through a vertical centerline of the UAV 200 and meets a surface of the shell 202 at protective grilles 258. A rotational thrust unit 262 is enclosed in an offset horizontal duct 264 that passes through a portion of the UAV 200 that is offset from the vertical centerline, and meets the surface of the shell 202 at protective grilles 266. Each of the thrust units 204a-d, 254, and 262 may be operable to effect force in two directions. Also two parallel thrust units with equal offset from the vertical centerline similar to 254, but with an offset, may be used to create similar forces to the combination of 254 and 262.

FIG. 8 illustrates the example UAV 200 in a top plan view, showing additional features and structure. For example, relative orientations of the ducted thrust units are shown including the vertical thrust units 204a-d, the horizontal thrust unit 254, and the rotational thrust unit 262. A first reference plane 230 passes through vertical thrust units 204b and 204d; and a second reference plane 232 passes through a center of the UAV 200 and intersects with the first reference plan 230 at the center of the UAV. The second plane 232 is rotationally offset from the first plane 230 by an angle 234. In the example UAV 200 shown, this offset angle 234 is 45 degrees. The central horizontal duct 244 runs parallel to and is bisected by the second plane 232; and the offset horizontal duct 264 runs orthogonal to and is bisected by the second plane 232. The UAV 200 can also include a concave feature 270 projecting upward into the body of the UAV from an inferior surface of the shell 202.

In various embodiments, the specific arrangement of the vertical thrust units may vary. For example, multiple vertical thrust units can be capable of providing net vertical thrust in the positive (up) or negative (down) directions in combination, and need not be disposed vertically. For example, vertical thrust units opposite one another across the UAV may be angled. In some cases, opposing vertical thrust unit pairs (such as 402a and 402c, or 402b and 402d) may be angled and disposed in angled ducts that lean toward one another. Furthermore, the vertical thrust units also need not be arranged in a square configuration about the center of the UAV. In some cases, the thrust units may be disposed in any symmetrical shape, such as a rectangular configuration or a rhomboid configuration; or may be arranged in an asymmetrical shape. In some other cases, pairs of adjacent thrust units (such as 402a and 402b, or 402c and 402d) can be angled toward one another to a greater degree than the degree to which said pairs are angled toward the center of the UAV, such that increasing a power output of one or more of said thrust units can impart rotational momentum on the UAV. Individual thrust units may be the same size or may be different sizes, for example to accommodate asymmetrical arrangements; or the individual thrust units may be generally operated at different powers to accommodate asymmetrical arrangements.

The shell 202, the inner surfaces 216 of the vertical ducts 214 (as well as inner surfaces the horizontal ducts 244 and 264), and a concave feature 270 can each be gas-impermeable, and can be gas-impermeably joined such that a volume of gas can be isolated and retained within the shell. In some cases, said gas may be a buoyant gas such as hydrogen, helium, heated air or nitrogen, or any other suitable lifting gas. The shell 202 may be also be formed of more than one material or structure, and may be formed of a different material from the ducts 214, 244, 264. For example, the ducts 214, 244, 264 may be formed of a lightweight and rigid structural material. Suitable materials may include metals such as aluminum, magnesium, titanium, alloys thereof, or any other suitable lightweight metal; plastics such as rigid nylon, acrylic, PCV, HDPE, polypropylene, polycarbonate, epoxy resin, melamine, or other suitable plastic; composite materials such as fiber-reinforced composites including, but not limited to, carbon fiber composites, glass fiber composites, textile fiber composites, or any other suitable composite; or other suitable material. Alternatively, the ducts 214, 244, 264 may be formed of a structural ring or rings at positions that are sensitive to duct diameter, such as at a location of a fan or at a location of a surface of the shell 202. Said structural rings may be formed of any lightweight structural material as discussed above, and any intervening surface area of a duct between said rings may be formed either of a structural material or of a flexible material.

The shell 202 can be formed of a rigid or semi-rigid structural material, such as any suitable lightweight structural material as discussed above; or the shell 202 may be formed of a flexible material, or a combination of both structural and flexible materials. For example, a shell may include a gas-impermeable membrane bonded, adhered, mechanically attached, or otherwise affixed to the shell. A flexible shell may include rigid framing members for supporting the structure of the shell and/or the orientation of the shell relative to the ducts 214, 244, and 216 and relative to any other features on or internal to the shell 202; but in some embodiments where said ducts or features are formed of rigid materials, the ducts or features may act as structural supports for the shell. For example, said ducts 214, 244, and 246 can be connected together by a rigid body independent of the shell 202, and the rigid body may be connected with the shell by way of stringers or wires. In another example, said ducts 214, 244, and 264 can impart structure to the shell 202 where the ducts attach at the surface of the shell; with the remaining rigidity of the shell being provided by interior pressure from a gas or gas-containing membranes. In various embodiments, the shell can be rigid, semi-rigid, or may be soft until inflated in the manner of a blimp or balloon.

The shell 202 can also be formed of an outer shell arranged for providing structure to and encapsulating one or more membranes interior to the shell for containing a buoyant gas. An outer shell can be rigid or semi-rigid, as discussed above, or can be flexible. For example, a flexible outer shell can be formed of a flexible plastic, fabric, foil, or composite material or layered sheet or sheets formed of any suitable combination of said flexible materials; and said flexible outer shell can be gas permeable and serve as a structure for containing one or more inner shells which can be gas impermeable. An inner shell may be formed of any suitable membrane material, such as a plastic, rubber, or composite material such as a sealed or treated fabric; and an inner shell can also be shaped to conform to one or more portions of an interior of the outer shell. For example, multiple inner shells may be shaped to fit adjacent to one another and within the outer shell, and may also be shaped to accommodate other features which pass through the UAV such as, for example, the ducts 214, 244, and 264. Multiple inner shells may also be loosely conforming to an interior of the shell. For example, inner shells formed of a flexible membrane material may be situated within the outer shell and inflated such that the inner shells roughly fill the interior space within the outer shell; and the inner shells may be caused to conform to the geometries of other interior features of the UAV by said features being rigid or semi-rigid, and the inner shells being inflated to approximately fill the gaps between said features.

The UAV 200 can also include an interior ballast element 240, positioned centered within the UAV, and an associated ballast port 242, in accordance with embodiments. The ballast element 240 can be used for adjusting the buoyancy of the UAV 200 by accommodating a volume of any suitable substance. For example, the net lifting force of the UAV 200 depends on its buoyant force (which is proportional to its displaced volume) and its weight. The net lifting force of the UAV 200 can be decreased by taking on a volume of a substance, i.e. via the ballast port 242 that has a greater density than the lifting gas. Likewise, the net lifting force of the UAV 200 can be increased by releasing a volume of a substance having a greater density than the lifting gas. In some cases, the interior ballast element 240 may be expanded to increase the pressure within the shell 202 of the UAV 200, which may also adjust the net buoyant force of the UAV even if the ballast element is expanded using a lighter-than-air gas if said expansion is restrained from causing substantial expansion of the shell 202 of the UAV. For example, in a UAV having an inelastic outer shell, an increase in the interior pressure may be unable to force the outer shell to expand. Suitable substances for using as ballast in conjunction with the interior ballast element 240 may include any suitable fluid, including suitable gases and liquids. In some embodiments, the ballast may be air, which is added to the ballast element 240 in order to displace and/or compress a volume of the lighter-than-air gas in the shell. In said embodiments, the air may be acquired from the environment around the UAV, or it may be provided via a contained mechanism such as a duct, hose, pressurized source exterior to the UAV or interior to the UAV, or other suitable source. In some embodiments, the ballast may be water. In alternative embodiments, ballast may be added or removed from the UAV 200 by any other suitable means, such as by adding or removing rigid weights to the UAV. In some embodiments, features for adjusting ballast can be omitted entirely. For example, the UAV 200 can exert upward and downward force using any or all of the vertical thrust units 204. Ballast may also be included in containers for transporting items when the UAV 200 is used for transporting.

FIG. 9 illustrates the example UAV 200 in a side cutaway view, showing additional features and structure along the first reference plane 230 shown in FIG. 8, in accordance with embodiments. For example, two vertical thrust units 204 are shown, as well as components of a vertical thrust unit including fan blades 206, fan hub 208, fan motor 210, fan support 212, vertical thrust unit duct 214, protective grille 218, and an inner surface 216 of a vertical thrust unit duct. In some cases, the fan motor 210 can be operable to spin more quickly or more slowly in order to adjust an amount of force generated, and in some cases can be selectively spun in a primary direction or in an inverted direction in order to selectively impart an upward or downward force, respectively. In some other cases, a fan support 212 can be operational to tilt a vertical thrust unit 204 to an upright or inverted position for selectively imparting an upward or downward force. In yet other cases, a pitch of the fan blades 206 can be changed (e.g. by a suitable mechanism at the hub 208) for adjusting an amount of upward or downward force, including selecting between an upward or downward force. In yet other cases, any suitable combination of the above fan control operations may be conducted together: for example, if a fan motor 210 switches from spinning in the primary direction to spinning in the inverted direction, fan blades 206 may undergo a change in orientation in order to optimally utilize an aerodynamic shape of the fan blades while they are being spun. In yet other cases, fan blades 206 may be formed in an aerodynamically neutral shape, such that fan blades are similarly effective when spun in a primary direction or in an inverted direction.

In some alternative embodiments, a vertical thrust unit 204 may possess more than one set of fan blades within a duct, such that a first set of fan blades can impart force upward in a vertical direction when said first set of fan blades is spun. When force downward is required, the first set of fan blades can be stopped; and a second set of fan blades can be spun to generate force in the downward direction. The second sets of fan blades may be associated with an additional motor, hub, and/or support structure.

The example UAV 200 can also include a horizontal displacement thrust unit 254 arranged within a horizontal duct 244 having an inner surface 256 that separates the thrust unit 254 from other interior features in the UAV 200. The horizontal displacement thrust unit 254, which is similar in some aspects to the vertical thrust units 204, can possess a support structure 252, fan blades 246, fan motor 250, and fan hub 248. The horizontal displacement thrust unit 254 may be operated so as to generate force in a forward direction and in a reverse direction using any suitable technique as described above with regard to the vertical thrust units 204 (with reference to upward and downward forces). Similarly, a rotational thrust unit 262 (shown in FIGS. 7 and 8) may be operated so as to generate force in a first or second direction using any such suitable technique.

In alternative embodiments of a UAV, additional horizontal displacement thrust units like horizontal displacement thrust unit 254 may be provided, as well as additional rotational thrust units like rotational displacement thrust unit 262 (FIGS. 7 and 8). In some alternative embodiments, two rotational displacement thrust units oriented at different locations around a perimeter of a UAV may be used in tandem to provide a non-rotating horizontal net force; and may be used individually to provide a rotating force. In various embodiments, the vertical thrust units 204 can be sufficiently powerful that they may support a total weight of the UAV 200 in the event of deflation, whether or not the UAV is carrying a payload. In some embodiments, the vertical thrust units 204 may be operable at both station keeping power outputs for managing vertical displacement while the UAV 200 is inflated and buoyant; as well as surge power outputs for managing vertical displacement when the UAV is deflated.

In various embodiments of a UAV, the shell 202 of the UAV 200 may include any suitable arrangement of pads, smooth surface, or other surface features for providing cushioning against impact by the UAV; or alternatively, the shell 202 may have surface features such as elasticity and surface smoothness such that the shell can act as a cushion against impact by the UAV. Likewise, the protective grilles 214, 218, and 256 may include cushioning and/or elastic material such that the grilles can also act as cushions against impact.

The example UAV 200 can also include a shell port 260 for providing fluid connection from an exterior of the shell 202 to the interior. For example, the shell port 260 can be used for adding or removing lifting gas to or from the shell 202; and in some cases, the shell port 260 can be used for partially deflating the shell during operation of the UAV 200 in order to adjust the buoyancy. For example, the shell 202 may be partially deflated via the shell port 260 in tandem with ballast being added to the interior ballast element 240 via the interior ballast element port 242, e.g. in order to regulate the pressure of the lifting gas or to regular the displaced volume of the UAV 200.

The example UAV 200 can also include a retention element 220 functional to retain a payload 222 and positioned within a concave feature 270 in the shell 202, in accordance with embodiments. In some examples, the retention element 220 may retain the payload 222 using friction, vacuum suction, opposing arms, opposing scoops or clasps, wires or cables, magnets, and other retaining methods. In some cases, the retention element 220 is operable to retain a variety of shapes and sizes of objects in order to accommodate a variably shaped payload 222; but in other cases, the retention element 220 is configured to grip a specific payload. The payload 222 can be a standard container, which may or may not possess standard surface features configured to interact with the retention element 220 for enabling lifting. In some cases, retention element 220 can be operable to interact with a finite set of different standard containers, e.g. a large, medium, and small standard container; or a standard container and a removable portion 184 of an inventory holder 180 (shown in FIG. 1); or any other suitable set of containers. In some cases, the retention element 220 may be fixed within the concave feature 270 such that payloads 222 must be received within the concave feature; but in other cases, the retention element 220 can include a mechanical actuator such that the retention element can be extended below the UAV 200 in order to receive a payload 222; and can retreat within the concave feature 270 with the received payload. In some cases, the UAV 200 can also include a protective cover (not shown) for the concave feature 270 which can protect the retention element 220 and any received payload 222, and can also provide for an elastic and/or smooth outer surface of the UAV 200 so as to provide additional cushioning against impact. In some cases, the retention element 220 can also include one or more sensors for scanning an identifier on a payload in order to, for example, determine an identify of the payload.

In some cases, the retention element 220 can also include a passive retention device, such as a static bin, shelf, hooks, or any other suitable passive receptacle for a payload. In such cases, the UAV 200 may also include one or more onboard input, output, or input/output (I/O) devices (not shown) for indicating that a payload has been loaded to the UAV or for providing instructions to a user or to an automated system for loading or unloading a payload at an origin or destination, respectively. In some alternate embodiments, the retention element 220 can be configured to attach with a second UAV, which may another instance of the same design. Accordingly, the UAV 200 can also include surface features at a superior or top surface for enabling another UAV to grip said surface features, which may include hooks, grooves, handles, or any other suitable feature.

The example UAV 200 can also include an onboard control element 280 functional to execute instructions related to the operation of the UAV. The onboard control element 280 may be included in an onboard computer for autonomously or semi-autonomously controlling and managing the UAV 200 and, in some examples, for enabling remote control by an inventory management system element such as inventory management system element 176 (FIG. 1) and/or a human pilot via remote control. In some alternative examples, the onboard control element may be a relay for instructions provided by an inventory management system, or may include onboard processing and memory to store instructions in the manner of a relay for instructions provided by an inventory management system. Portions of the onboard control element 280 may be housed within the shell 202 of the UAV 200, may be arranged at an exterior surface of the UAV, and/or may be accessible through the shell via a port or opening in an outer shell. The UAV onboard control element 280 may be part of system that includes the onboard power supply 284 and related assemblies (e.g., power supply port 282), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RA- DAR), and other systems to aid in navigating the UAV 200 and detecting objects) (not shown), radio-frequency identification (RFID) capability (not shown), and interfaces capable of speech interpretation and recognition (not shown).

The UAV 200 can include an onboard power supply 284 functional to provide electrical power to any suitable onboard component. The onboard power supply 284 can include a rechargeable battery, which may be connectable to a recharging station or external power supply via a power supply port 282. In some cases, the onboard power supply may include any other suitable form of power supply (e.g. replaceable battery, liquid combustible fuel, liquid fuel cell, and other power supplies); and the power supply port 282 may include any suitable means of recharging, replacing, or refueling the power supply. For example, in alternative embodiments, the power supply port 282 can include a mechanical tethering point and electrical connection for an electrically transmitting tether.

The example UAV 200 also includes an onboard sensing element 286. The sensing element 286 may comprise one or more sensors for detecting a state of the UAV and/or information about the surrounding environment. Said sensors can be positioned at various surfaces of the shell 202. For example, a plurality of visual sensors can be positioned at outer surfaces of the shell 202 and facing in various directions such as: up, down, and in four or more directions around an equatorial perimeter of the shell. For instance, an image sensor configured to detect a position of the UAV may be coupled to an exterior of a top portion of the UAV to detect markers or identifiers attached to a ceiling or a wall of a warehouse. As another example, a scanner, RF reader, or image sensor may be coupled to a bottom portion of the UAV pointing substantially downward so as to detect a optical barcode (e.g., a Quick Response (QR) code, a Universal Product Code (UPC)), radio frequency identifier (RFID), or the like associated with a transportable object. By way of further example, spatial sensors, acceleration sensors, and any other suitable sensor that does not require line-of-sight access to reference positions can be located within the shell, and can be posited at or in the onboard sensing element 286 and/or the onboard control element 280, or at any other suitable component. Sensors may also be included, for example, at the retention element 220. In some cases, sensors such as a visual scanner and/or an RFID scanner, or any other suitable scanner for identifying a container, item, or package, can be included at the retention element 220 and oriented to scan any suitable payload, such as the payload 222. The sensing element 286 can detect various states of the UAV, which may include a spatial disposition (e.g., position, orientation, or attitude), a velocity (e.g., linear or angular velocity), an acceleration (e.g., linear or angular acceleration), and/or other information about the UAV. The state may be absolute (e.g., latitude and/or longitude) or relative (e.g., relative to an inertial system). Information about the surrounding environment may include weather conditions (e.g., temperature, humidity), proximity to and/or location of objects (e.g., geographical features, manmade structures, humans, or animals), and the like. Objects detectable by the sensing system can include any object related to an inventory system such as an inventory holder or inventory item, a mobile drive unit, a human or automated operator, a ceiling, wall, or floor of a storage space, and the like. Examples of such sensors may include position sensors (e.g., GPS sensor and magnetometer), motion sensors (e.g., accelerometers), rotation sensors (e.g., gyroscope), inertial sensors, proximity sensors (e.g., ultrasound sensors, Lidar sensors, or infrared sensors), light sensors (e.g., imaging device, depth sensor, visible light camera, infrared camera, RGB camera, depth aware camera, infrared laser projector, ultraviolet sensitive cameras, scanning sensor, light filters and any combination of the foregoing), auditory sensors (e.g., microphone, noise filters, and other sensors for capturing sound), and the like.

Figure 10:
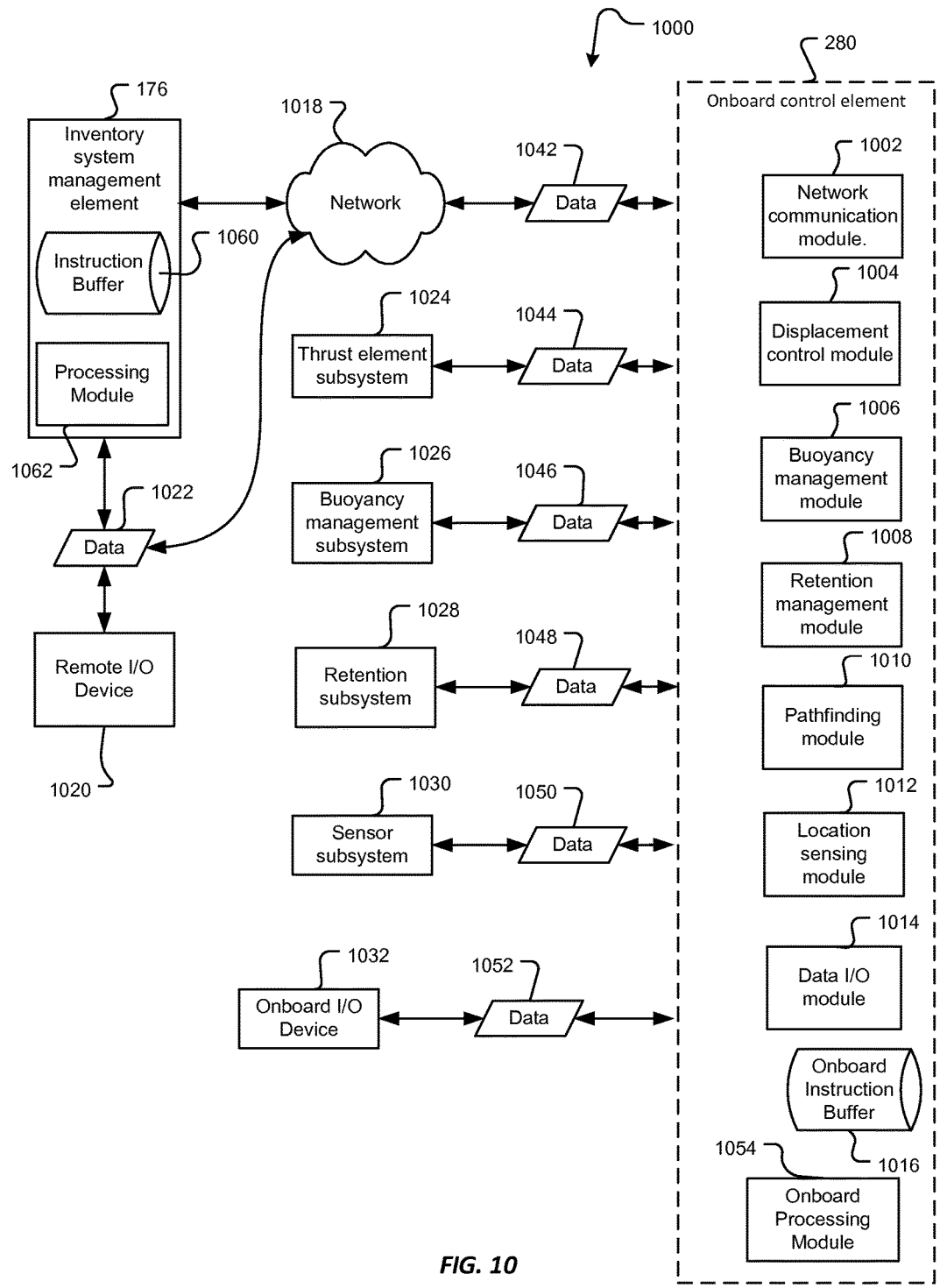
FIG. 10 illustrates an example system for controlling a UAV, in accordance with embodiments.

FIG. 10 illustrates a block diagram of an example system 1000 for controlling an unmanned aerial vehicle, such as the unmanned aerial vehicle 200 shown in FIGS. 7-9, in accordance with embodiments, and in accordance with embodiments of the system 100 of FIG. 1. For example, the onboard control element 280 (see also FIGS. 7-9) can include any or all of, or any suitable combination of the following modules: a network communication module 1002, a displacement control module 1004, a buoyancy management module 1006, a retention management module 1008, a pathfinding module 1010, a location sensing module 1012, a data input/output (I/O) module 1014, an onboard instruction buffer 1016 which can include an onboard data storage device, and an on board processing module 1054 for enabling operation of and/or communication between any of the above modules. Any or all of said modules may be configured to enable automated or semiautonomous actions by a UAV based on high-level instructions received from an inventory system management component such as the inventory system management element 176 (see also FIG. 1). The onboard control element 280 can include a computer system configured to receive instructions via a network and cause the UAV 200 to act in accordance with those instructions. The onboard control element 280 can be configured as a centralized component in communication with other components of the UAV 200; or in alternative embodiments, the onboard control element 280 can include parts distributed and/or collocated among one or more of the other components.

The modules making up the onboard control element can each execute instructions at corresponding components of the UAV 200, which can include at least the following components and subsystems: a thrust element subsystem 1024 (which can control thrust units such as the thrust units 204, 254 and 262), a buoyancy management subsystem 1026, a retention subsystem 1028, a sensor subsystem 1030, and an onboard I/O device 1032. The thrust element subsystem 1024 can send and receive thrust element data 1044 from the onboard control element 280 including, for example, instructions to operate specific instances of thrust units (e.g. a particular fan or group of fans) at a specified power output and/or direction of output; and can communicate information concerning the thrust element subsystem such as current power output and output direction. The buoyancy management subsystem 1024 can receive buoyancy management data 1044 from the onboard control element 280 including, for example, instructions to take on or to release ballast. The buoyancy management subsystem 1024 can likewise communicate information concerning information concerning the buoyancy management subsystem to the onboard control element including, for example: a load or an available capacity of an internal ballast element, or a pressure in a lifting-gas envelope. The retention subsystem 1028 can send and receive retention data 1048 including, for example, instructions to retain or to release a payload and/or a detected weight of a currently retained payload. The sensor subsystem 1030 can send and receive sensor data 1050 to and from the onboard control element 288. The sensor subsystem 1030 can communicate, for example, data obtained via the sensors such as images, scanned information from a visual scanner or other scanner, or any other suitable sensed information concerning the environment; and can receive instructions to use the sensor subsystem to scan particular locations or items, to adjust a direction of a sensor such as a camera, to adjust a gain of any suitable sensor, or other suitable instructions for controlling the sensor subsystem. The onboard I/O device can include, for example, a switch, keyboard, screen, touchscreen, microphone, or any other suitable device for entering a user input at the UAV 200 or for displaying a visual or audible output, and can send and receive I/O data 1052 to and from the onboard control element 280. I/O data 1052 can include, for example, instructions from a user to override a preexisting instruction, such as: a "stop" instruction for causing the UAV to hold station rather than continue in a programmed path; a "shutoff" instruction for causing the UAV to power down and land; a "soft shutoff" instruction for causing the UAV to return to a docking station and power down; a "return to base" instruction for causing the UAV to return to a particular docking station, such as a maintenance bay for troubleshooting the UAV or an inventory station for troubleshooting an inventory management error; or any other suitable instruction. I/O data 1052 can include instructions for the UAV to display a status message, such as: an "in transit" message; a "waiting" message; a "busy" message; any suitable error message; or any other suitable message or status identifier.

The onboard control element 280 can send and receive network communication data 1042 via a network 1018 to and/or from the inventory management system element 176 (see also FIG. 1). The inventory system management element 176 can include an instruction buffer 1060, which can include memory and/or a data storage device for storing executable instructions, and a processing module 1062. A remote I/O device 1020 can also send and receive remote input/output data 1022 to the inventory management system 176 directly, to the inventory management system via the network 1018, and/or to the onboard control element 280 via the network. Remote input/output data 1022 can include, for example: a data flow for remote control via a remote device; instructions to retrieve or to transport an item; or any other suitable instruction. Communication between the inventory system management element 176 or remote I/O device 1020 and the onboard control element 280 can be facilitated at the onboard control element by, for example, the network communication module 1002. The network communication module 1002 can also facilitate, in some cases, wireless communication between one UAV and another UAV within an inventory system, for example, to provide position data for collision avoidance.

The inventory system management element 176 can communicate instructions via the network 1018 to the UAV 200 by transmitting the instructions to the onboard control element 280, where they can be processed by the onboard processing module 1054 and/or stored in the onboard instruction buffer 1016 for access by the onboard processing module. The instructions can be prepared at the processing module 1062 of the inventory system management element 176, and can also be stored therein at the instruction buffer 1060. The multiple instruction buffers can enable some degree of autonomy of the UAV 200 separate from the inventory management system element 176: for example, instructions to retrieve items can be prepared at the processing module 176 and stored in the instruction buffer 1060, and updated periodically to the onboard instruction buffer 1016; while the onboard processing module 1054 can perform the instructions stored locally at the onboard instruction buffer in the absence of overriding instructions from the inventory system management element 176.

Figure 11:
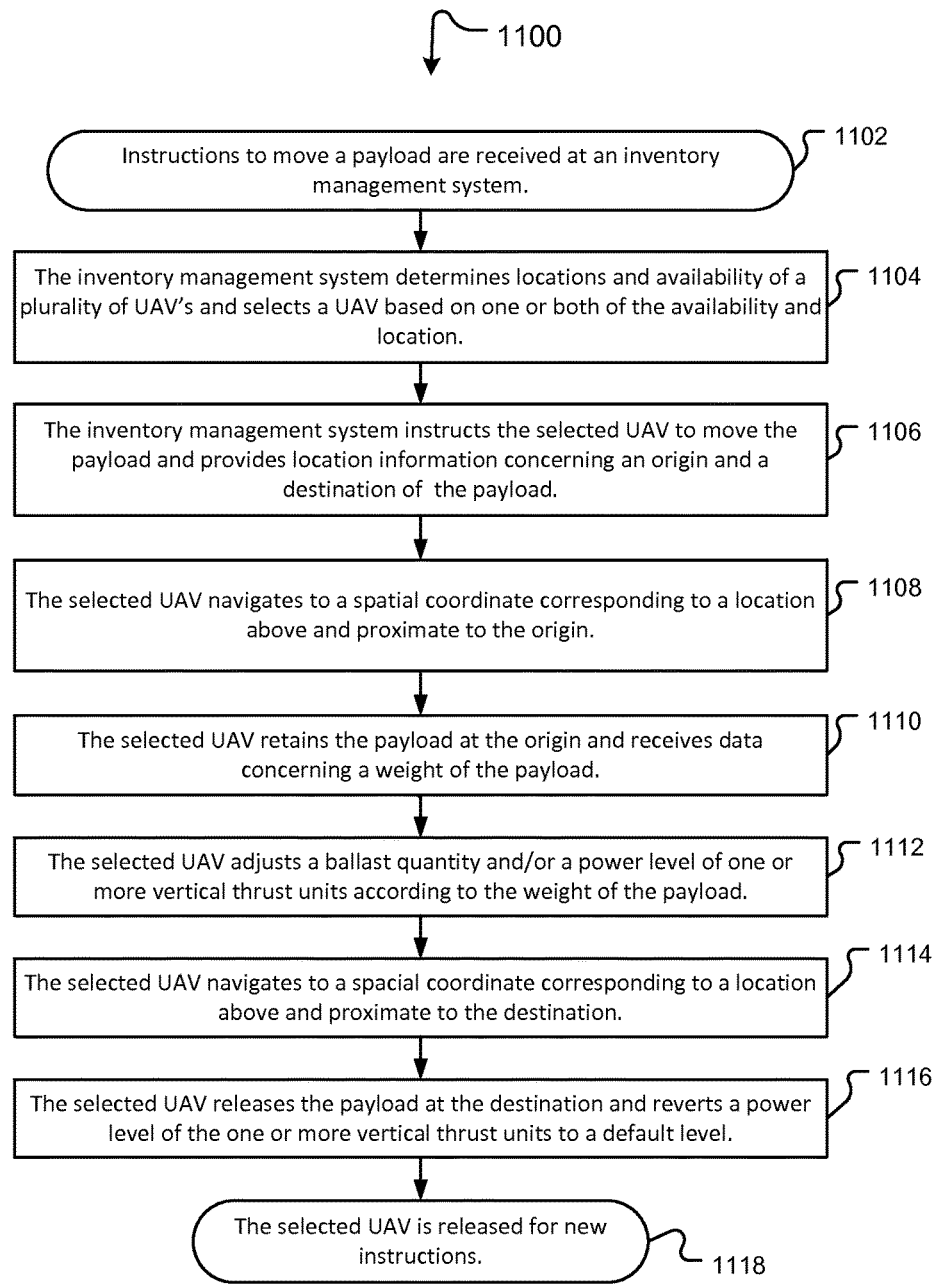
FIG. 11 is an example process for controlling a UAV, in accordance with embodiments.

FIG. 11 is an example process 1100 for controlling a UAV, in accordance with embodiments. Aspects of the process 1100 may be performed, in some embodiments, by a system similar to the system 1000 discussed in FIG. 10. The system may be implemented by a UAV such as that discussed in FIGS. 1 and 7-9.

In an embodiment, the process 1100 includes receiving instructions to move a payload in an inventory management system (1102). The information can include a first location and a second location for moving the payload, and information concerning an identity of the payload. The first location may be a current location of the payload whereas the second location may be a location where the payload is to be moved to. In various embodiments, the first location and the second location can be a storage location, a location at or near an inventory station, a location at or near a mobile drive unit, a location at or near a human or automated operator, a location at or near a docking station, or any other suitable location in an inventory system. In various embodiments, the payload to be moved can include any object that can be moved by a mobile drive unit such as an inventory holder, a detachable component of an inventory holder, an inventory item, or a container for holding one or more inventory items for transport by a UAV. In some embodiments, the object may also include a mobile drive unit, a mobile inventory station, or even a human or automated operator.

Next, the process 1100 includes determining a location and an availability of a UAV, which may include determining location and availability information concerning a plurality of UAVs and selecting a UAV from the plurality (1104). Selecting the UAV can include selecting the nearest UAV from a subset of the plurality of UAVs that includes the available UAVs, and may also include restricting the subset based on other attributes such as a weight capacity of the UAV and the weight of the payload.

Next, the process 1100 includes providing the instructions to the UAV for moving the payload (1106), which can include providing location information concerning first and second locations (or origin and destination locations) for moving the item, flight path information, and other suitable instructions. The instructions can be provided by a system such as the inventory management system element 176 on continuous or semi-continuous bases to the UAV; or the instructions can be transmitted to the UAV and stored thereon such that an onboard processing module can carry out the stored instructions.

The process 1100 further includes the UAV navigating to a special coordinate corresponding to the first location 1108, which may be a point proximate to and above the first location, such that an retention subsystem on the UAV can interact with the payload at the first location. For example, where the first location is at a docking station, navigating to the first location can include docking at the docking station containing the payload. Where the first location is an inventory holder with a removable shelf or an item disposed in a shelf at the top of the inventory holder, navigating to the first location can include positioning the UAV above the inventory holder. Where the first location is at an inventory station, navigating to the first location can include navigating to a point within the inventory management facility that is horizontally offset from the inventory station, such that the UAV can be within reach of an automated loading system or a workstation.

Next, the process 1100 includes the UAV attaining and retaining the payload and receiving information concerning the payload, such as the weight (1110). In some cases, the UAV can measure said information directly; but in other cases, the information can be provided to the UAV by, for example, an automated system at a docking station, an operator, by the inventory management system based on information stored in a database, or any other suitable means. In some cases, said information may be provided indirectly by providing instructions to the UAV based on the information.

The process 1100 further includes causing the UAV to adjust a quantity of ballast and/or to adjust a power level of one or more vertical thrust units of the UAV (1112) in order to counteract a weight of the payload. In cases where the UAV generates greater buoyant force than the weight of the UAV and payload, adjusting a power level of one or more vertical thrust units can also include reversing a direction of the output of the vertical thrust units so as to push the UAV down, and can include taking on additional ballast. If a payload weight, UAV weight, and ballast perfectly balance a buoyancy force of the UAV, then the vertical thrust units may idle.

Next, the process 1100 further includes causing the UAV to navigate to spatial coordinates corresponding to the second location (1114), which includes causing various thrust units of the UAV including the vertical, horizontal, and vertical displacement thrust units to activate. In some cases, a processor onboard the UAV can determine a path and cause the UAV to follow the path based on location information provided by an inventory management system. In other cases, the UAV can navigate a path provided by the inventory management system, or the UAV can be controlled by the inventory management system directly. Navigating to the second location can include navigating to a location spatially proximate to the second location, such as a position above a location for depositing the payload. For example, where the second location is at a second docking station, navigating to the second location (1114) can include docking at the second docking station.

The process 1100 further includes causing the UAV to release the payload at the second location (1116). Where the second location is a docking station, releasing the payload can include, for example: releasing the payload from a retention element containing the payload, opening a hatch for permitting the removal of the payload, or any other suitable means for releasing a payload. Where the second location is an inventory holder with a removable shelf or an open shelf at the top of the inventory holder, releasing the payload can include lowering the UAV to a position immediately above the inventory holder and releasing the payload from a retention element. Where the second location is at an inventory station, releasing the payload can include navigating to a point within the inventory management facility that is horizontally offset from the inventory station, such that the UAV can be within reach of an automated loading/unloading system or a workstation, and providing an indication that the payload can be removed and/or releasing the payload from a retention element.

The process 1100 can end following the release of the payload, permitting the UAV to be released for new instructions 1118. In some cases, releasing the UAV for instructions can include providing an indication to an inventory management system that the UAV is unoccupied and can also include causing the UAV to take on ballast, to begin navigating a holding pattern, to return to a designated waiting location, and/or any other suitable holding action.

Figure 12:
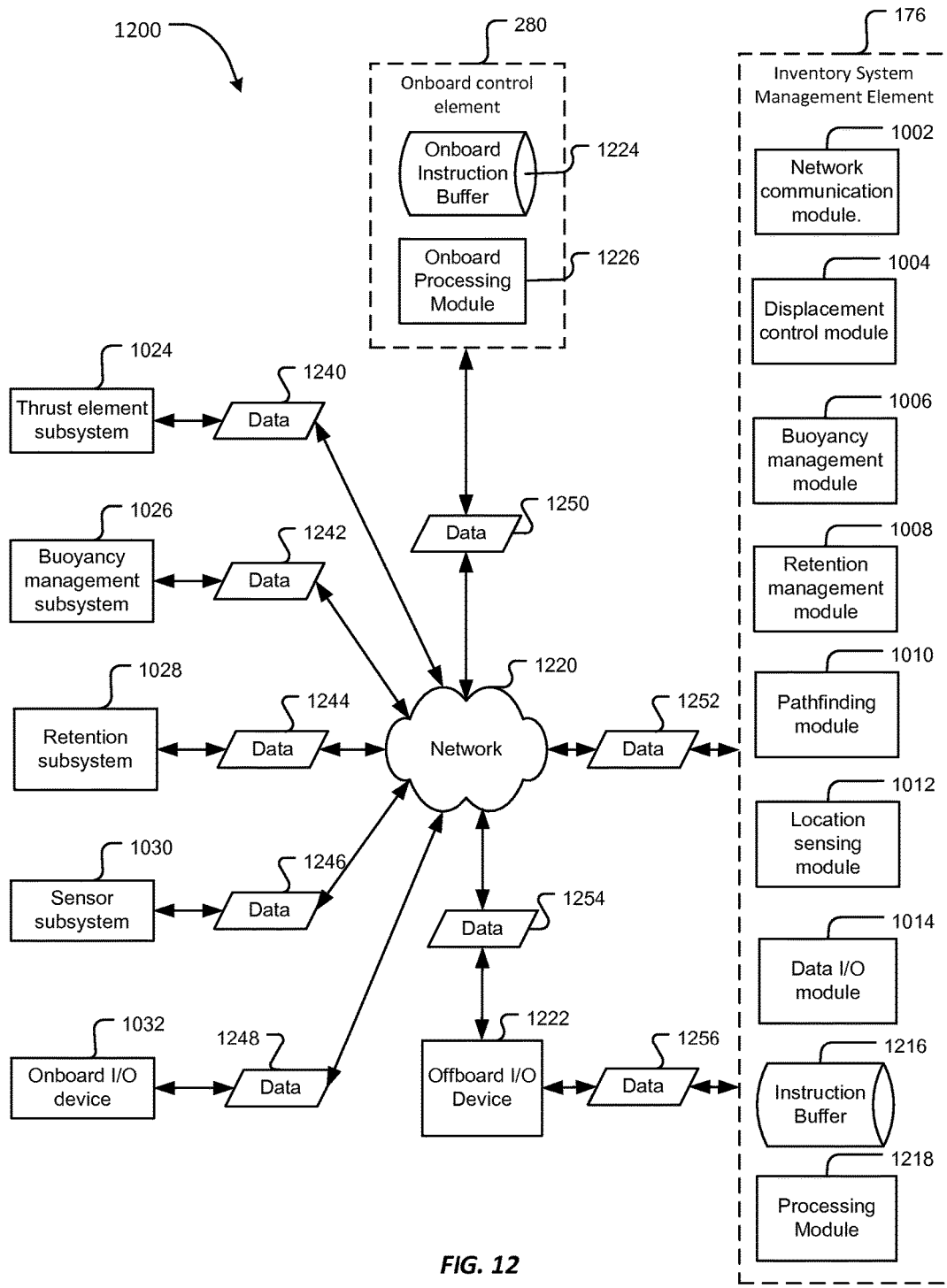
FIG. 12 illustrates a second example system for controlling a UAV, in accordance with embodiments.

FIG. 12 illustrates a second example system 1200 for controlling a UAV such as the UAV 200 shown in FIGS. 7-9, in accordance with embodiments, and in accordance with embodiments of the system 100 of FIG. 1. For example, the onboard control element 280 (see also FIGS. 7-9) can include an onboard instruction buffer 1224 and an onboard processing module 1226 for executing instructions stored in the onboard instruction buffer and/or instructions communicated via a network 1220. An inventory management system element 176 (see also FIG. 1) can also include a processing module 1218 for executing instructions stored in an instruction buffer 1216 and/or generated by one or more modules in the inventory system management element 176. The inventory system management element 176 can include any or all of the following modules: a network communication module 1002, a displacement control module 1004, a buoyancy control module 1006, a retention management module 1008, a pathfinding module 1010, a location-sensing module 1012, and a data I/O module 1014.

Any or all of the modules listed above may be configured to generate instructions for causing actions at corresponding components of the UAV 200, which can include at least the following components and subsystems: a thrust element subsystem 1024 (which can control thrust units such as the thrust units 204, 254 and 262), a buoyancy management subsystem 1026, a retention subsystem 1028, a sensor subsystem 1030, and an onboard I/O device 1032 (see also FIG. 10). The above subsystems can send and receive management data 1252 via the network 1220 to and from the inventory management system element 176, and can also send and receive control data 1250 to and from the onboard control element 280, and can send and receive off-board I/O data 1254 to and from the off-board I/O device.

For example, the thrust element subsystem 1024 can receive thrust element data 1240 from the inventory system management element 176, the onboard control element 280, or both elements via the network 1220. The thrust element data 1240 can include instructions including, for example, instructions to operate specific instances of thrust units (e.g. a particular fan or group of fans) at a specified power output and/or direction of output; and can communicate information concerning the thrust element subsystem such as current power output and output direction. The thrust element subsystem 1024 can be configured to prioritize instructions from one source or another; for example, the thrust element subsystem can by default receive instructions from the onboard control element 280 until an overriding command is issued from the inventory system management element 176 and/or the off-board I/O device 1222.

The inventory system management element 176 can override local control by the onboard control element 280 in order to cause the UAV to change from one task to a different task. The off-board I/O device 1222 can override local control by the onboard control element 280 in order to, for example, cause the UAV to hold station, stop, power down, return to base (e.g. for maintenance), or to perform any other suitable discrete command. The off-board I/O device 1222 can also communicate and receive off-board I/O data 1256 to and from the inventory system management 176. For example, off-board I/O data 1256 can include instructions to prioritize a task, to redirect a UAV from a task to a different task, to suspend (or resume) the use of UAVs in the inventory system, or other suitable instructions for administering the inventory system management; and the off-board I/O device can also receive information for display, such as a list of ongoing tasks, a list of UAVs and associated status identifiers (e.g. "active, inactive, engaged in a task, waiting for a task, holding station," or any other suitable identifier).

Each of the buoyancy management subsystem 1026, retention subsystem 1028, sensor subsystem 1030, and onboard I/O device 1032 can, respectively, communicate buoyancy management data 1242, retention data 1244, sensor data 1246 and onboard I/O data 1248 (respectively) to and from either of the onboard control element, the inventory system management element 176, or both via the network 1220. Each of said subsystems can control aspects of the UAV as described above in the description of FIG. 10 in accordance with instructions generated at the inventory system management element 176 by one or more of the modules including: the network communication module 1002, the displacement control module 1004, the buoyancy control module 1006, the retention management module 1008, the pathfinding module 1010, the location sensing module 1012, and the data I/O module 1014. Said modules can also generate and receive data in a manner similar to that described above in reference to FIG. 10.

Figure 13:
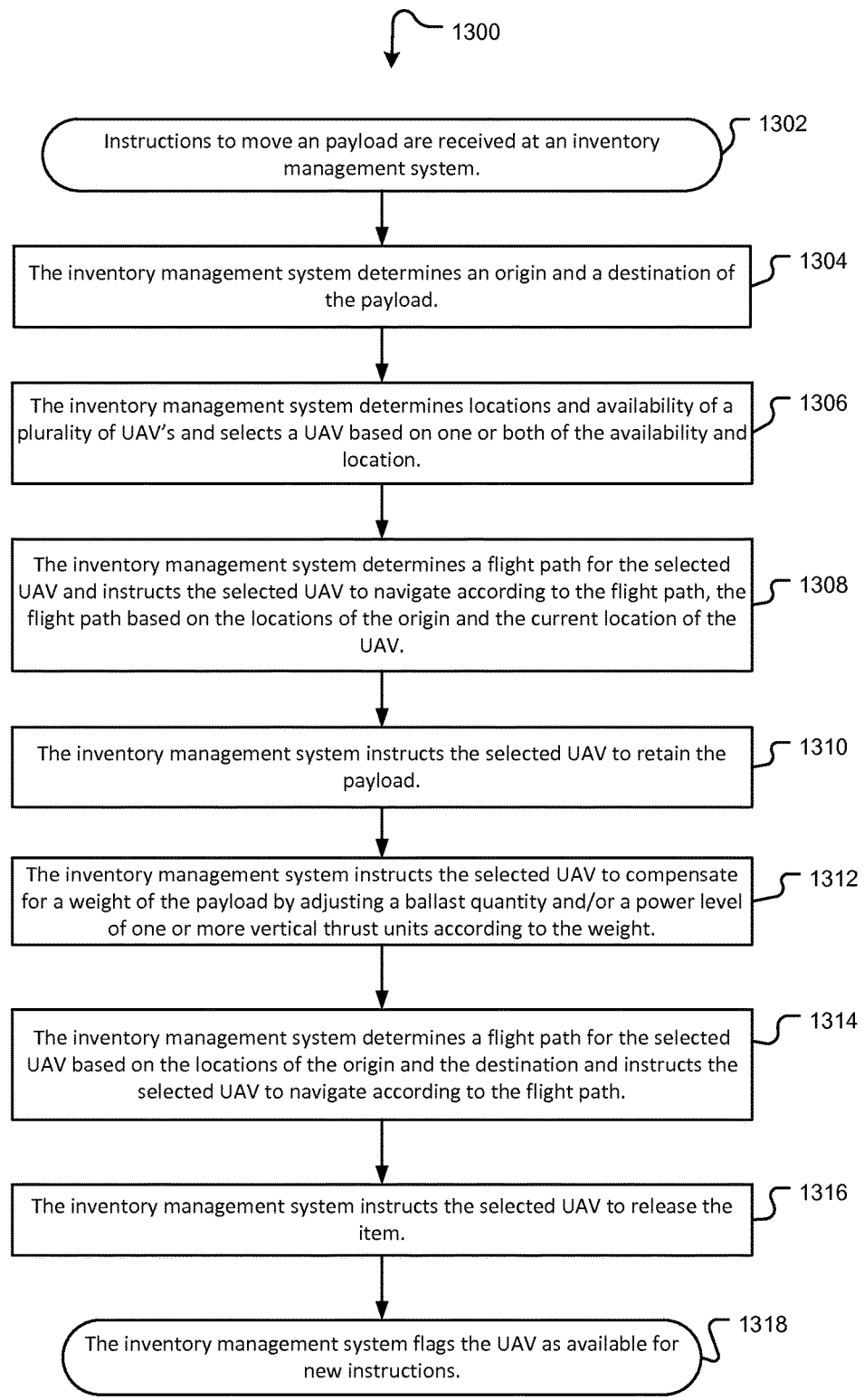
FIG. 13 is a second example process for controlling a UAV, in accordance with embodiments.

FIG. 13 is a second example process 1300 for controlling a UAV, in accordance with embodiments. Aspects of the process 1300 may be performed, in some embodiments, by a system similar to the system 1200 discussed in FIG. 12. The system may be implemented by a UAV such as that discussed in FIGS. 1 and 7-9.

In an embodiment, the process 1300 includes receiving instructions to move a payload in an inventory management system (1302). The information can include a first location and a second location for moving the payload, and information concerning an identity of the payload. The first location may be a current location of the payload whereas the second location may be a location where the payload is to be moved to. In various embodiments, the first location and the second location can be a storage location, a location at or near an inventory station, a location at or near a mobile drive unit, a location at or near a human or automated operator, a location at or near a docking station, or any other suitable location in an inventory system. In various embodiments, the payload to be moved can include any object that can be moved by a mobile drive unit such as an inventory holder, a detachable component of an inventory holder, an inventory item, or a container for holding one or more inventory items for transport by a UAV. In some embodiments, the object may also include a mobile drive unit, a mobile inventory station, or even a human or automated operator.

Next, the process 1300 includes determining a location and an availability of a UAV, which may include determining location and availability information concerning a plurality of UAVs and selecting a UAV from the plurality (1304). Selecting the UAV can include selecting the nearest UAV from a subset of the plurality of UAVs that includes the available UAVs, and may also include restricting the subset based on other attributes such as a weight capacity of the UAV and the weight of the payload.

Next, the process 1300 includes providing the instructions to the UAV for moving the payload (1306), which can include providing location information concerning first and second locations (or origin and destination locations) for moving the item, flight path information, and other suitable instructions. The instructions can be provided by the inventory management system element 176 on a continuous or semi-continuous basis to the subsystems of the UAV; or the instructions can be transmitted to an onboard instruction buffer of the UAV and stored thereon such that an onboard processing module can carry out the stored instructions.

The process 1300 further includes providing instructions that cause the UAV to navigate to a special coordinate corresponding to the first location (1308), which may be a point proximate to and above the first location, such that an retention subsystem on the UAV can interact with the payload at the first location. For example, where the first location is at a docking station, navigating to the first location can include docking at the docking station containing the payload. Where the first location is an inventory holder with a removable shelf or an item disposed in a shelf at the top of the inventory holder, navigating to the first location can include positioning the UAV above the inventory holder. Where the first location is at an inventory station, navigating to the first location can include navigating to a point within the inventory management facility that is horizontally offset from the inventory station, such that the UAV can be within reach of an automated loading system or a workstation.

Next, the process 1300 includes causing the UAV to attain and retain the payload, and can also include causing one or more subsystems to determine a weight of the payload (1310). In some cases, the inventory management system element 176 can cause the UAV to measure said information via a retention subsystem or a buoyancy management subsystem; but in other cases, the information can be provided to the inventory management system by, for example, a docking station, an operator, via a database accessible by the inventory management system based on an identity of the item or items comprising the payload, or any other suitable means.

The process 1300 further includes causing the UAV to adjust a quantity of ballast and/or to adjust a power level of one or more vertical thrust units of the UAV (1312) in order to counteract a weight of the payload. In cases where the UAV generates greater buoyant force than the weight of the UAV and payload, adjusting a power level of one or more vertical thrust units can also include reversing a direction of the output of the vertical thrust units to push the UAV down. If a payload weight, UAV weight, and ballast perfectly balance a buoyancy force of the UAV, then the vertical thrust units may idle.

Next, the process 1300 further includes determining a flight path and causing the UAV to navigate along said flight path to spatial coordinates corresponding to the second location (1314), which includes causing various thrust units of the UAV including the vertical, horizontal, and vertical displacement thrust units to activate. Navigating to the second location can include navigating to a location spatially proximate to the second location, such as a position above a location for depositing the payload. For example, where the second location is at a second docking station, navigating to the second location (1314) can include docking at the second docking station.

The process 1300 further includes causing the UAV to release the payload at the second location (1316). Where the second location is a docking station, releasing the payload can include, for example: releasing the payload from a retention element containing the payload, opening a hatch for permitting the removal of the payload, or any other suitable means for releasing a payload. Where the second location is an inventory holder with a removable shelf or an open shelf at the top of the inventory holder, releasing the payload can include lowering the UAV to a position immediately above the inventory holder and releasing the payload from a retention element. Where the second location is at an inventory station, releasing the payload can include navigating to a point within the inventory management facility that is horizontally offset from the inventory station, such that the UAV can be within reach of an automated loading/unloading system or a workstation, and providing an indication that the payload can be removed and/or releasing the payload from a retention element.

The process 1300 can end following the release of the payload, permitting the UAV to be available for new instructions (1318). In some cases, releasing the UAV for instructions can causing the UAV to take on ballast, to begin navigating a holding pattern, to return to a designated waiting location, and/or any other suitable holding action.

Figure 14:
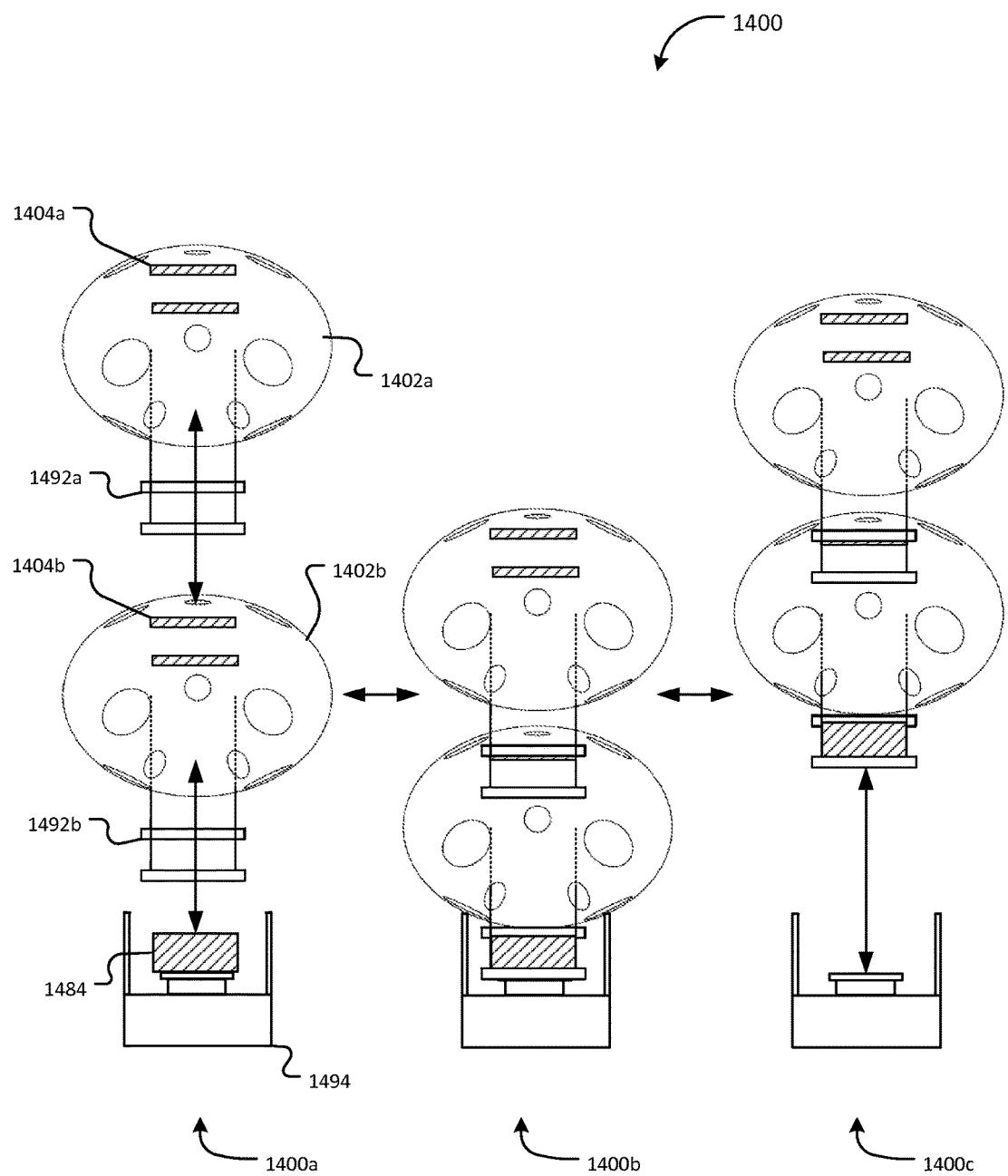
FIG. 14 illustrates third system for controlling a UAV, and specifically a first UAV connecting with a second UAV to form a UAV pair for retrieving a payload, in accordance with embodiments.

FIG. 14 illustrates a system 1400 for controlling a UAV to connect with a second UAV and retrieve a payload, in accordance with embodiments. The system 1400 can be implemented in accordance with embodiments of the system 100 shown in FIG. 1, and with two UAVs comparable to the UAV 200 shown in FIGS. 7-9. In a first stage 1400a of the system 1400, an upper UAV 1204a is initially positioned above a lower UAV 1402b. Each of the upper and lower UAVs 1402a, 1402b possesses superior surface features 1404a, 1404b, and retention elements 1492a, 1492b, respectively. In the system 1400 as shown, the UAVs are also positioned above a docking station 1494 with a payload 1484 positioned thereon.

In a second stage 1400b of the system 1400, the upper and lower UAVs 1402a, 1402b have each descended such that the upper UAV is docked with the lower UAV. The upper UAV 1402a is secured with the lower UAV 1402b by the retention features 1492a of the upper UAV gripping the surface features 1404b of the lower UAV 1402b. The lower UAV 1402b is also docked with the docking station 1494, and the retention element 1492b thereof is engaged with the payload 1484.

In a third stage 1400c of the system 1400, the upper and lower UAVs 1402a, 1402b are linked as a unit, such that the buoyant elements and thrust elements of both UAVs work in concert to increase the effective lifting power of the linked unit. The linked unit of UAVs can be controlled by an inventory management system element 176 (FIG. 1) in a similar manner to that for controlling a single UAV. In some embodiments, linked UAVs can be arranged such that one UAV is "passive" and contributes buoyancy to the linked UAV system. In an active/passive linked UAV system, the active UAV can perform all other functions such as causing the linked system to move, retaining a package, and other suitable functions while the passive UAV can act as an additional source of buoyant lift. In some other embodiments, linked UAVs can be arranged in an active/active system, such that both UAVs can perform functions. For example, while a lower UAV in an active/active linked UAV system might be the only UAV capable of retaining a payload, both UAVs among the active/active linked UAV pair may be able to contribute lift via vertical thrust units, cause the system to move, or any other suitable function. In some alternate embodiments, more than 2 UAVs can be linked together to form a chained combination of multiple UAVs for lifting heavy items.

Figure 15:
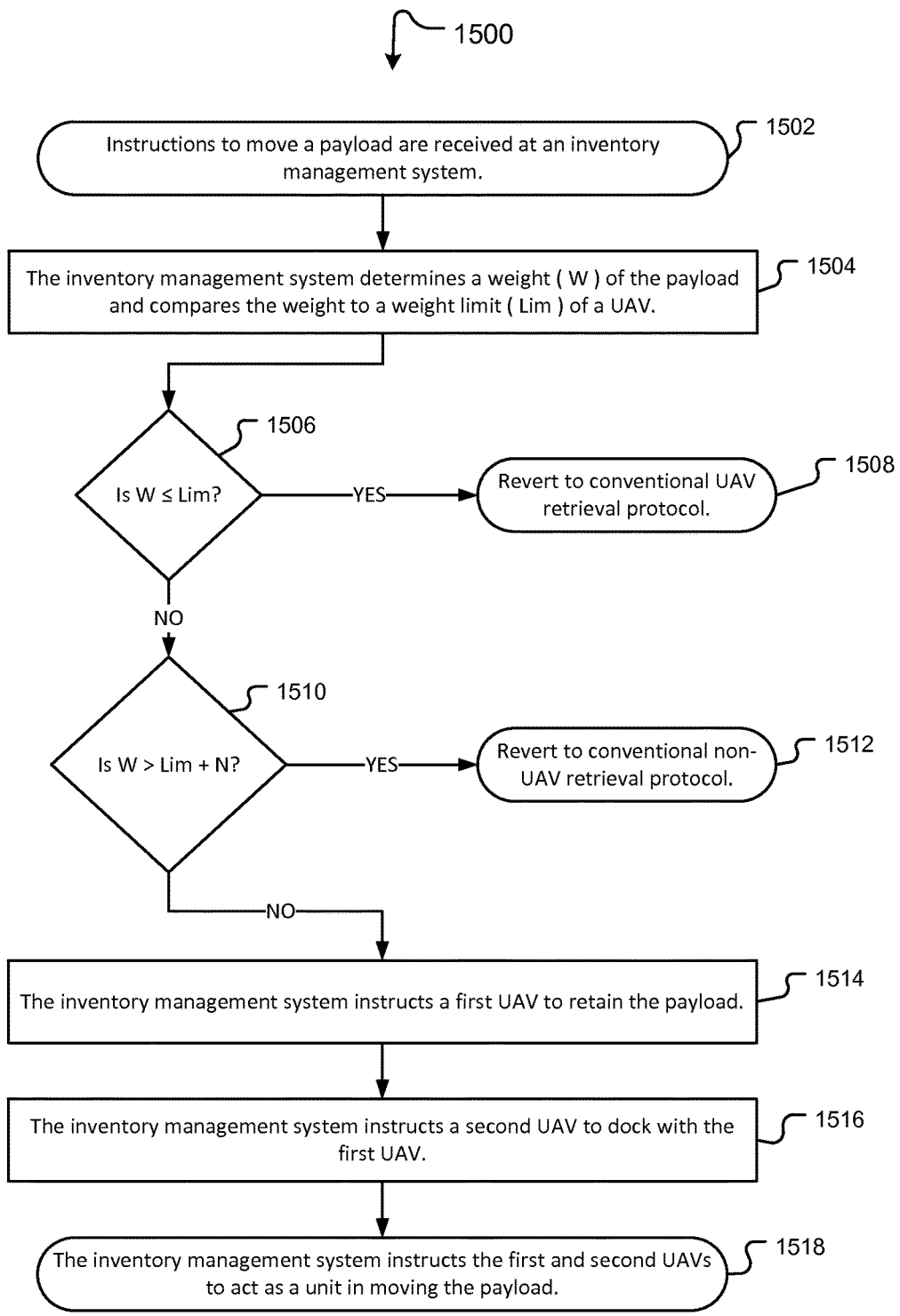
FIG. 15 is a third example process for controlling a UAV, and specifically a UAV pair, in accordance with embodiments.

FIG. 15 is a third example process for controlling a UAV, and specifically a UAV pair, in accordance with embodiments. Aspects of the process 1500 may be performed, in some embodiments, by a system similar to the system 1400 discussed in FIG. 14. The system may be implemented by a UAV such as that discussed in FIGS. 1 and 7-9.

In an embodiment, the process 1500 includes receiving instructions to move a payload in an inventory management system (1502). The information can include a first location and a second location for moving the payload, and information concerning an identity of the payload. The first location may be a current location of the payload whereas the second location may be a location where the payload is to be moved to. In various embodiments, the first location and the second location can be a storage location, a location at or near an inventory station, a location at or near a mobile drive unit, a location at or near a human or automated operator, a location at or near a docking station, or any other suitable location in an inventory system. In various embodiments, the payload to be moved can include any object that can be moved by a mobile drive unit such as an inventory holder, a detachable component of an inventory holder, an inventory item, or a container for holding one or more inventory items for transport by a UAV. In some embodiments, the object may also include a mobile drive unit, a mobile inventory station, or even a human or automated operator.

Next, the process 1500 includes receiving information concerning the payload, such as the weight of the payload (1504). In some cases, the UAV can measure said information directly; but in other cases, the information can be provided to the UAV by, for example, an automated system at a docking station, an operator, by the inventory management system based on information stored in a database, or any other suitable means. In some cases, said information may be provided indirectly by providing instructions to the UAV based on the information.

Next, the process 1500 includes determining whether the payload weight (W) exceeds a known limit (Lim) of the selected UAV (1506). The limit can be a property of the UAV corresponding to a maximum payload weight that can be accommodated for a task. For example, the limit may be the net buoyant force of the UAV. In some cases, the limit may correspond to a sum of the net buoyant force of the UAV and a standard output of vertical thrust units of the UAV (e.g., an output that can be maintained for a period of time). If the payload weight is less than the limit, then the process 1500 can revert to a system for controlling a single UAV (1508), such as systems 1000 and 1200.

If the payload weight (W) does exceed the limit (Lim) for a single UAV (at 1506), then the process 1500 includes determining whether the weight falls within a suitable range (between Lim and Lim+N). In some cases, the range may include a range from the limit to twice the limit (or N=Lim). In some other cases, the range may differ depending on, for example, weight capacity of a retention element, the efficiency of vertical thrust elements when placed in close proximity with other UAVs, or other suitable parameters. If the payload weight exceeds the range (W>Lim+N), then the system 1500 can refer the instructions (of 1502) to an alternative retrieval system (1512).

If the payload weight (W) falls within a suitable range, as discussed above, then the process (1500) can include instructing a first UAV to retain the payload (1514). The first UAV can, for example, dock with a docking station containing the payload thereat, and may connect with the payload via a retention element of the UAV. Alternatively, the first UAV can, for example, connect with a removable shelf in an inventory holder. Then the system can instruct a second UAV to dock with and attach with the first UAV (1516), such that the first and second UAVs form a linked pair. In some cases, the first and second UAVs can dock with one another to form the linked pair before connecting with the payload. The process 1500 can further include instructing the linked pair of UAVs as a unit (1518), such that the linked pair of UAVs can perform inventory transport function in a manner similar to those described in the processes 1100 and 1300 above, or any other suitable process.

Figure 16:
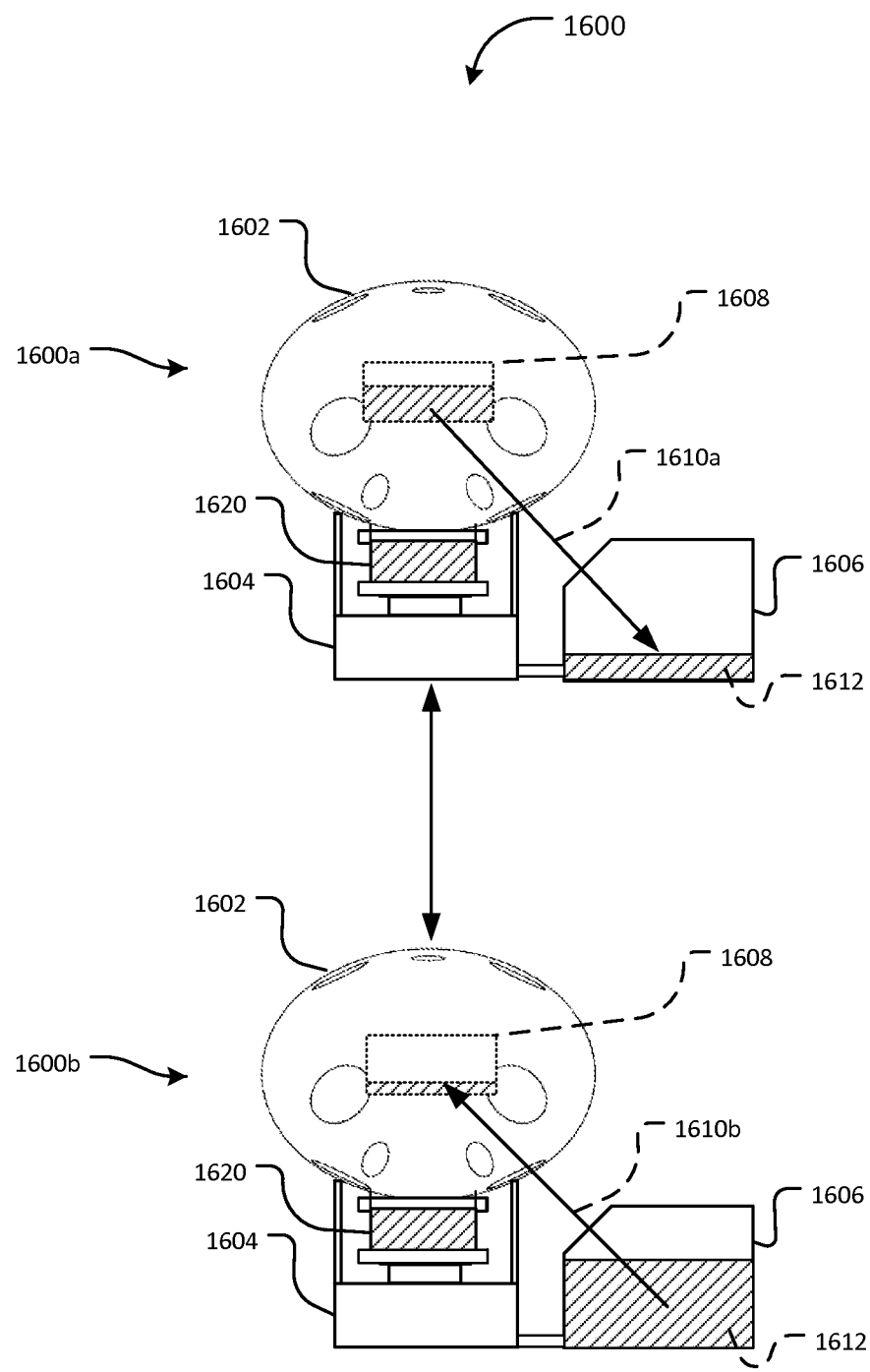
FIG. 16 illustrates a fourth system for controlling a UAV, and specifically for a UAV connecting with a docking station, in accordance with embodiments.

FIG. 16 illustrates a third example system 1600 for controlling a UAV, such as the unmanned aerial vehicle 200 shown in FIGS. 7-9, in accordance with embodiments, and in accordance with embodiments of the system 100 of FIG. 1. The system 1600 focuses specifically on a system for causing a UAV 1602 to adjust ballast at a docking station 1604, in accordance with embodiments.

The system 1600 can include a UAV 1602 configured to engage with a docking station 1604, in accordance with embodiments. The UAV 1602 includes an onboard ballast container 1608 and means for transferring material into and out of the onboard ballast container. Said means can include, for example, a pump (or compressor) and an inlet/outlet port connectable with an exterior of the UAV 1602. In some cases, the means for transferring can include an inlet/outlet port connectable with the exterior of the UAV via an inlet/outlet port, and which can be connected with a pump, compressor, or other means for generating a flow of a ballast material at the docking station 1604.

In a ballast offload state 1600a of the system 1600, the UAV 1602 can dock with the docking station 1604 and also connect with a payload 1620. After docking and connecting, the UAV 1602 can transfer 1610a a portion of ballast 1612 from the onboard ballast container 1608 to a ballast reservoir 1606 at the docking station 1604. The offloading transferring operation 1610a can transfer a quantity of ballast 1612 based on the weight of the payload 1620, such that the UAV can more easily lift the payload.

In a ballast onload state 1600b of the system 1600, the UAV 1602 can dock with the docking station 1604 and place a carried payload 1620 in contact with or in close proximity with the docking station. After docking, the UAV 1602 can transfer 1610b a portion of ballast 1612 from the ballast reservoir 1606 to the onboard ballast container 1608. The onloading transferring operation 1610b can transfer a quantity of ballast 1612 based on the weight of the payload 1620, such that the UAV can safely release the payload and remain at or near a neutral net buoyancy.

Figure 17:
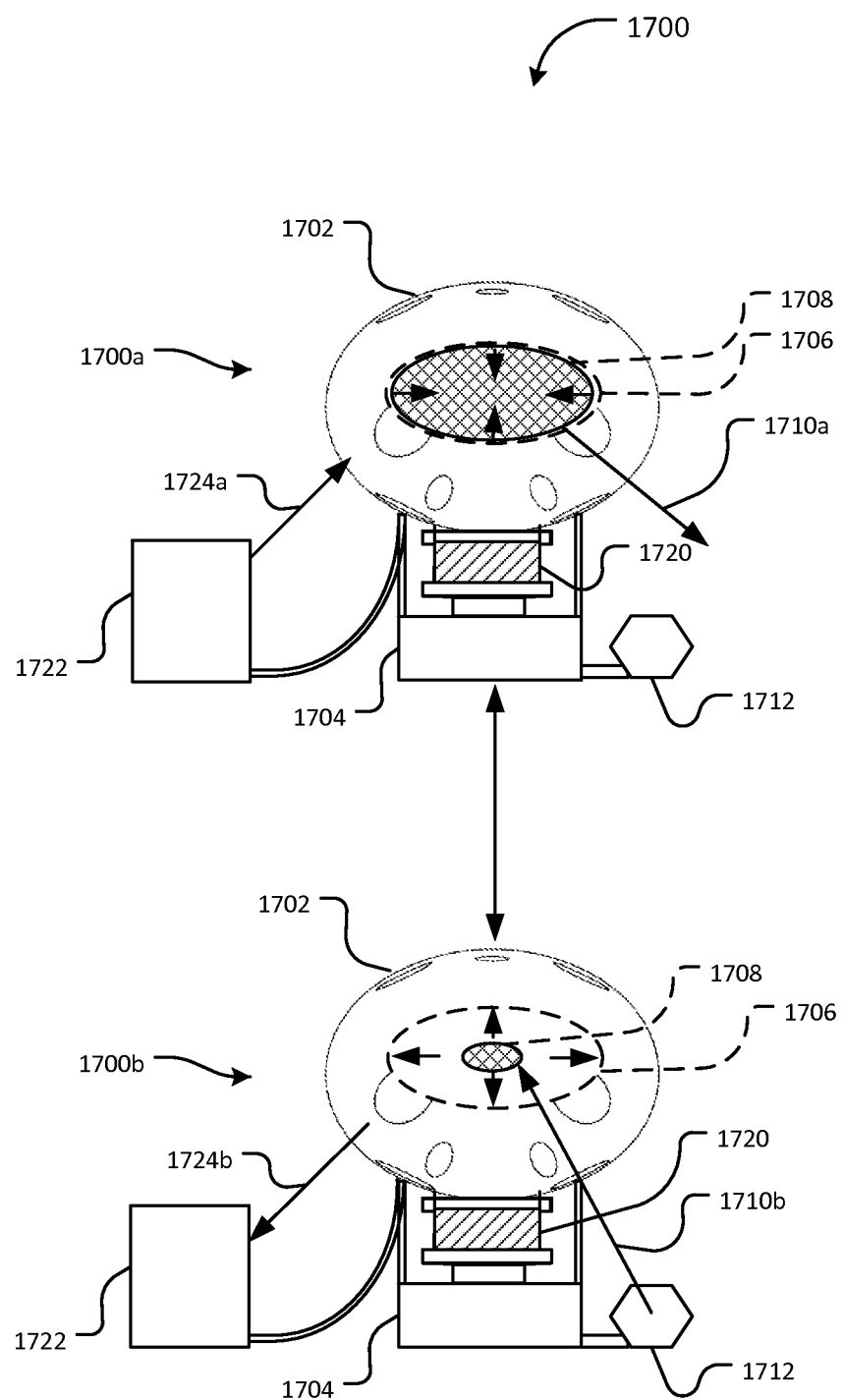
FIG. 17 illustrates a fifth system for controlling a UAV, and specifically for a UAV connecting with a docking station, in accordance with embodiments.

FIG. 17 illustrates a fourth example system 1700 for controlling a UAV, also focusing specifically on a system for causing a UAV 1702 to adjust ballast at a docking station 1704, in accordance with embodiments.

The system 1700 can include a UAV 1702 configured to engage with a docking station 1704, in accordance with embodiments. The UAV 1702 includes an expandable ballast container 1706 with an expanded size boundary 1708 and means for transferring material into and out of the expandable ballast container. Said means can include, for example, a pump (or compressor) such as compressor 1712 and an inlet/outlet port connectable with an exterior of the UAV 1702. In some cases, the means for transferring can include an inlet/outlet port connectable with the exterior of the UAV via an inlet/outlet port, and which can be connected with a pump, compressor, or other means for generating a flow of a ballast material.

In a ballast offload state 1700a of the system 1700, the UAV 1702 can dock with the docking station 1704 and also connect with a payload 1720. After docking and connecting, the UAV 1702 can transfer 1710a a portion of ballast 1712 from the expandable ballast container 1708 for example, by releasing a volume of air to the atmosphere 1710a. In cases where the ballast material is not air, the ballast material can be offloaded to a storage means (not shown) as described above in FIG. 16. The offloading transferring operation 1710a can transfer a quantity of ballast based on the weight of the payload 1720, such that the UAV can more easily lift the payload.

In a ballast onload state 1700b of the system 1700, the UAV 1702 can dock with the docking station 1704 and place a carried payload 1720 in contact with or in close proximity with the docking station. After docking, the UAV 1702 can transfer 1710b a portion of ballast 1712 from the ballast reservoir 1706 to the onboard ballast container 1708. The onloading transferring operation 1710b can transfer a quantity of ballast 1712 based on the weight of the payload 1720, such that the expandable ballast container expands and compresses the buoyant gas in the UAV 1702, reducing the buoyancy of the UAV such that the UAV can safely release the payload and remain at or near a neutral net buoyancy.

In some cases, a reservoir of buoyant gas 1722 may also be provided at the docking station 1704, such that a docked UAV 1702 can acquire additional buoyant gas 1724a during a ballast offload state 1700a; and can release buoyant gas 1724b during a ballast onload state 1700b. The provision of the reservoir of buoyant gas can permit the UAV to adjust ballast using air in a gross buoyancy adjustment regime whenever the UAV is docked at a docking station 1704. The gross buoyancy adjustment regime can allow the UAV to operate with a consistent internal pressure during normal operation. In some cases, the UAV can also adjust ballast on the fly in a fine buoyancy adjustment regime by increasing or decreasing the pressure in the expandable ballast container, so as to increase or decrease the net buoyant force in small amounts, for example, to accommodate environmental conditions that affect net vertical force (such as, for example, airflow patterns in the environment, humidity, environmental air pressure, ambient temperature, or other comparable environmental conditions) or unanticipated variable conditions, such as an unanticipated reduction in payload weight, collision, malfunction, or other comparable occurrence.

Figure 18:
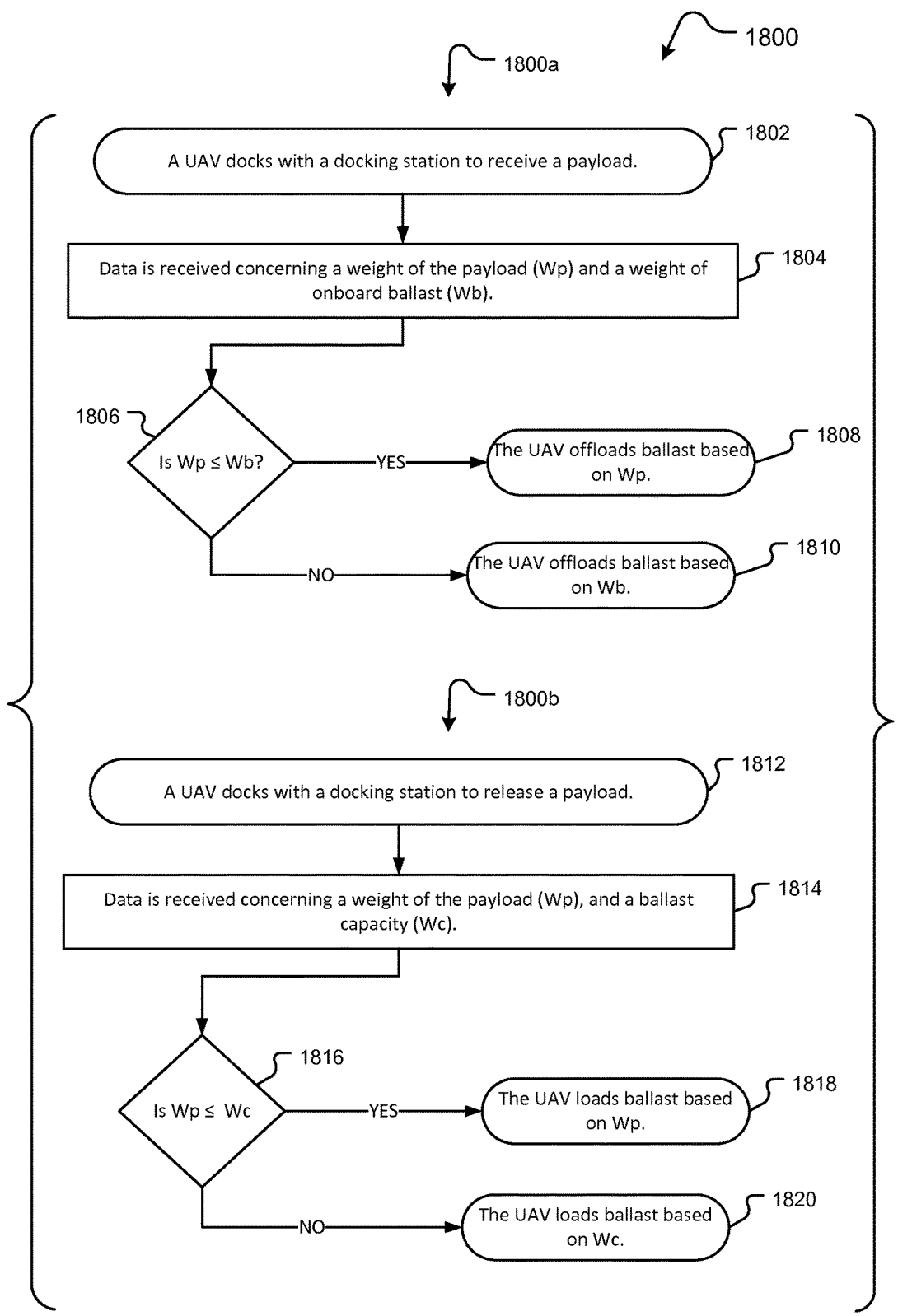
FIG. 18 illustrates a fourth example process for controlling a UAV, and specifically for a UAV connecting with a docking station, in accordance with embodiments.

FIG. 18 illustrates a fourth example process 1800 for controlling a UAV, and specifically a ballast offload process 1800a and a ballast onload process 1800b for controlling an unmanned aerial vehicle, in accordance with embodiments. Aspects of the process 1800 may be performed by a system similar to the system 1600 discussed in FIG. 16, as well as systems 1000 and 1200 discussed in FIGS. 10 and 12. The system may be implemented by a UAV such as that discussed in FIGS. 1, 7-9, and 16.

In a ballast offload process 1800a, the UAV can dock with a docking station for receiving a payload thereat (1802), in accordance with embodiments. The system can receive information concerning a weight of the payload (Wp) and weight of onboard ballast (Wb) (1804). The information can be generated by one or more sensors at the docking station and/or at a retention element connected with the UAV, or can be stored in a database and accessed via the system based on an identify of the payload and/or items therein, or by any other suitable method. If the weight of the payload (Wp) is less than a weight of the onboard ballast (Wb), then a weight of the onboard ballast can be offloaded (1808) based on the weight of the payload. For example, in some cases, when the UAV receives a payload, an equal weight of ballast can be removed, to maintain the original net buoyancy of the UAV. In some other cases, it may be advantageous for the UAV to retain additional effective weight when carrying items, such that a smaller amount of ballast is removed than the weight of the payload. In some other cases, the higher effective weight may be advantageous when not carrying items, such that a greater amount of ballast might be removed than the weight of the payload in order to minimize the net effective weight of the UAV with the payload. If the weight of the payload (Wp) is greater than weight of the onboard ballast (Wb), then the onboard ballast can be offloaded (1810) based on the weight of the onboard ballast. For example, in some cases, where the weight of a payload is greater than the ballast capacity of a UAV, but where the UAV is capable of carrying the payload with the additional support of one or more vertical thrust elements, or with the additional support of a linked support UAV (see FIGS. 14-15), then all or most of the ballast currently retained by the UAV can be removed.

In a ballast onload process 1800*b*, the UAV can dock with a docking station for depositing a payload thereat (1812), in accordance with embodiments. The system can receive information concerning a weight of the payload (Wp) and maximum possible weight of onboard ballast, or a ballast capacity (Wc) (1814). The information can be stored in a database and accessed via the system based on an identity of the payload and/or items therein, or by any other suitable method. If the weight of the payload (Wp) is less than the ballast capacity (We), then a weight of ballast can be onloaded (1818) based on the weight of the payload. For example, in some cases, when the UAV deposits a payload, an equal weight of ballast can be added to the UAV, to maintain the original net buoyancy of the UAV. If the weight of the payload (Wp) is greater than the ballast capacity (Wb), then the onboard ballast can be filled to capacity (1810). For example, in some cases, the ballast capacity may be configured to match a default state for an unladen UAV. In some other cases, the onboard ballast container may be filled to a standard level corresponding with net neutral buoyancy of an unladen UAV.

Figure 19:
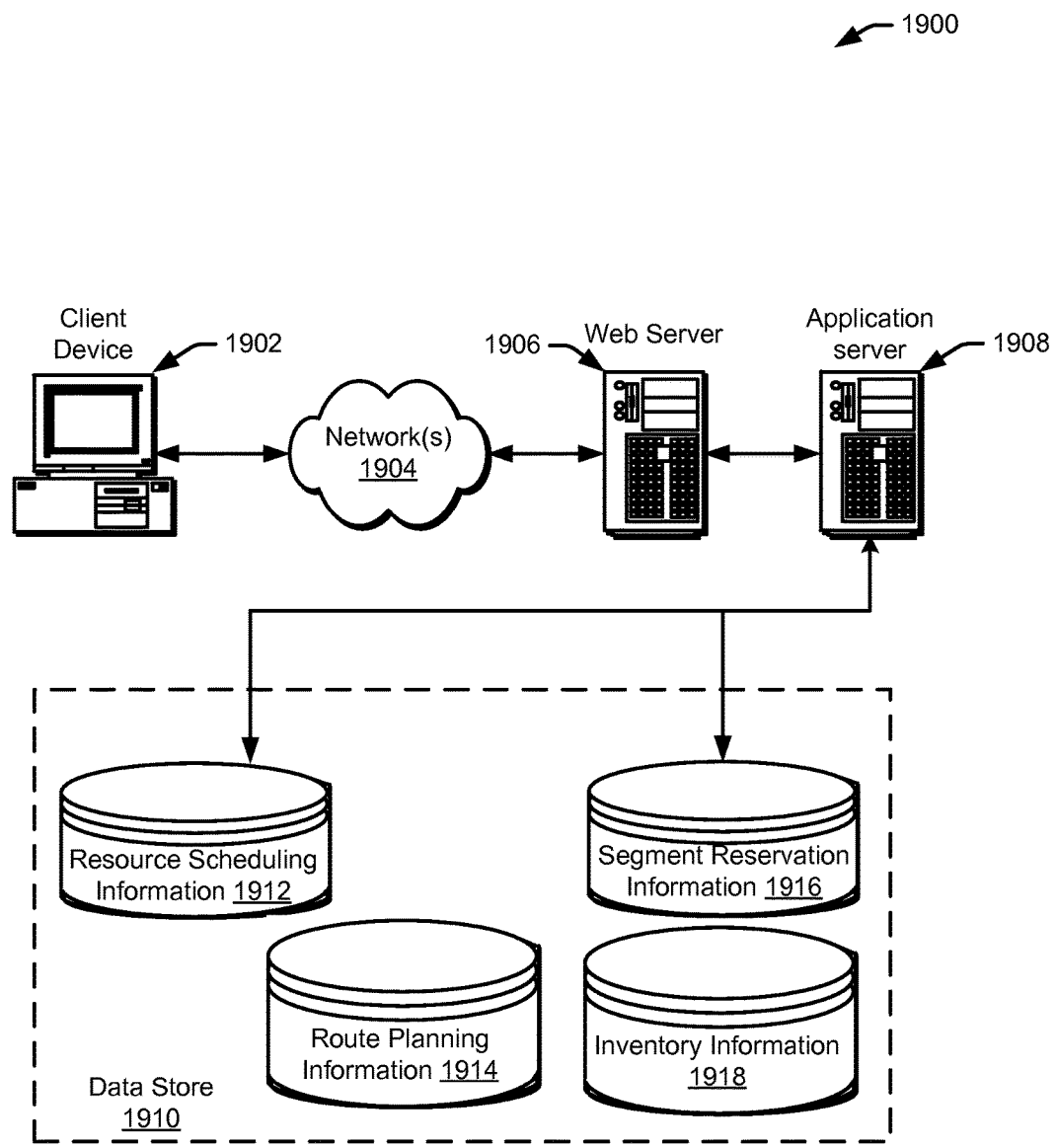
FIG. 19 illustrates an environment in which various features of the inventory system can be implemented, in accordance with at least one embodiment.

FIG. 19 illustrates aspects of an example environment 1900 for implementing aspects in accordance with various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages, or information over an appropriate network 1904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1902 and the application server 1908, can be handled by the Web server. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing information that can be used by modules described herein, such as resource scheduling information 1912, route planning information 1914, segment reservation information 1916, and/or inventory information 1918. It should be understood that there can be many other aspects that may need to be stored in the data store, such as for page image information and to access right information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1800 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
an outer shell defining an outer boundary of a lifting gas envelope arranged to enclose a volume of lighter-than-air gas;
the UAV further comprising a plurality of discrete and substantially vertical ducts, comprising at least four substantially vertical ducts, the ducts being arranged symmetrically across a plane passing through a vertical centerline of the UAV, and pass through the lifting gas envelope within the outer shell, and extend between a superior surface of the outer shell to an inferior surface of the outer shell, and fluidly connecting an exterior of the outer shell at the superior surface with the exterior of the outer shell at the inferior surface, wherein the ducts are not connected with each other and are spaced apart from a center of the UAV;
a plurality of fans correspondingly disposed within the plurality of ducts to control movement of the UAV;
a retention feature connected with the shell to selectively retain an item; and
a management component configured to control the UAV.

2. The unmanned aerial vehicle of claim 1, further comprising:
a substantially horizontal duct passing through the outer shell and fluidly connecting the exterior of the outer shell at an anterior surface of the unmanned aerial vehicle with the exterior of the outer shell at a posterior surface of the unmanned aerial vehicle; and
a horizontally oriented fan for controlling movement, the horizontally oriented fan being disposed inside the horizontal duct.

3. The unmanned aerial vehicle of claim 2, wherein the management component further comprises a computing device configured with executable instructions in order to, at least:
receive information relating to the item;
instruct the UAV to move to a first location above the item;
instruct the UAV to retain the item; and
instruct the UAV to move the item to a second location.

4. An unmanned aerial vehicle (UAV), comprising:
an outer shell defining an outer boundary of a lifting gas envelope within the outer shell configured to contain a volume of lighter than air gas;
a plurality of thrust units connected with the outer shell;
a retention element connected with the outer shell, the retention element configured to selectively retain an item; and
a management component configured to control the unmanned aerial vehicle; wherein
the outer shell further comprises a plurality of discrete, substantially vertical ducts passing through the lifting gas envelope within the shell of the UAV from a superior surface of the shell to an inferior surface of the shell, the substantially vertical ducts being disconnected from each other and spaced apart from a center of the UAV;
the plurality of thrust units comprises at least one set of four thrust units within corresponding ducts of the plurality of substantially vertical ducts; and
each duct of the plurality of ducts contains a thrust unit of the plurality of thrust units.

5. The UAV of claim 4, wherein the lifting gas envelope comprises a gas-impermeable membrane affixed within the outer shell to accommodate the volume of the lighter-than-air gas.

6. The UAV of claim 4, further comprising a ballast element connected with the outer shell and configured to take in air for displacing a portion of the volume of the lighter-than-air gas.

7. The UAV of claim 4, further comprising a ballast element connected with the outer shell and configured to take a heavier-than-air fluid.

8. The UAV of claim 4, wherein the shell further comprises a concave surface feature extending into the shell at an exterior of the UAV, and wherein at least part of the retention element is arranged within the concave surface feature.

9. The UAV of claim 4, further comprising:
a substantially horizontal duct passing through a portion of the outer shell and offset from a horizontal centerline of the outer shell; and
a horizontally oriented drive element for controlling spin, the horizontally oriented drive element being located within the substantially horizontal duct.

10. The UAV of claim 4, further comprising:
a sensor configured to detect attributes of an environment; and wherein the management component is configured to control the UAV in order to:
determine a path for navigating between a first location and a second location based in part on the attributes of the environment.

11. The UAV of claim 4, further comprising:
a sensor configured to detect an attribute of the item; and wherein the management component is configured to control the UAV in order to:
cause the retention element to retain the item based on the attribute.

12. A system comprising:
an unmanned aerial vehicle (UAV) comprising:
- an outer shell defining an outer boundary of a lifting gas envelope within the outer shell configured to accommodate a volume of lighter-than-air gas;
- at least four discrete and substantially vertical ducts connected with the outer shell that penetrate through the lifting gas envelope from a superior surface of the shell to an inferior surface of the shell the substantially vertical ducts being disconnected from each other and spaced apart from a center of the UAV;
- at least four thrust elements, each positioned in a respective one of the at least four substantially vertical ducts;
- a retention element, the retention element configured to selectively retain an item; and
- a management component configured to control the unmanned aerial vehicle; and a docking station comprising:
- a platform configured to interface with the unmanned aerial vehicle.

13. The system of claim 12, wherein the UAV further comprises a ballast element for retaining ballast; and wherein the docking station further comprises a ballast transfer feature for transferring ballast between the ballast element of the UAV and the docking station.

14. The system of claim 12, wherein the UAV further comprises a power supply; and wherein the docking station comprises a recharging feature for recharging the power supply.

15. The system of claim 12, wherein the docking station further comprises a sensor configured to sense information concerning a property of the item and to communicate the information to the management component.

16. The system of claim 12, wherein the UAV further comprises:
- a sensor configured to sense information concerning one or more of a height, speed, or acceleration of the UAV; and wherein the management component is further configured to cause the UAV to:
- adjust an output of at least one of the thrust elements in order to change one or more of the height, speed, or acceleration.

17. The system of claim 12, wherein the management component is further configured to control the UAV to, in response to receiving instructions including information concerning a location of the item, cause the UAV to navigate from a current location to the location of the item.

18. The system of claim 17, wherein the management component is further configured to control the UAV to:
- receive information about the item including at least an origin and a destination of the item; and
- cause the UAV to navigate to the item, retain the item, and transport the item to the destination.

19. The UAV of claim 4, wherein the plurality of thrust units are arranged in a quadcopter arrangement.

20. The UAV of claim 4, wherein each thrust unit of the plurality of thrust units can be independently controlled to provide horizontal displacement of the UAV by tilting the UAV.

* * * * *